(12) United States Patent
Du

(10) Patent No.: US 8,682,988 B2
(45) Date of Patent: Mar. 25, 2014

(54) ENHANCED E-MAIL AND MESSAGING SYSTEM WITH VISUAL PROFILE AND SELECTIVE UPDATE

(76) Inventor: Qiang Du, Mountain View, CA (US)

( * ) Notice: Subject to any disclaimer, the term of this patent is extended or adjusted under 35 U.S.C. 154(b) by 178 days.

(21) Appl. No.: 13/019,954

(22) Filed: Feb. 2, 2011

(65) Prior Publication Data

US 2011/0191433 A1 Aug. 4, 2011

Related U.S. Application Data

(60) Provisional application No. 61/301,032, filed on Feb. 3, 2010, provisional application No. 61/367,824, filed on Jul. 26, 2010, provisional application No. 61/393,720, filed on Oct. 15, 2010.

(51) Int. Cl.
*G06F 15/16* (2006.01)

(52) U.S. Cl.
USPC ........... 709/206; 709/204; 709/205; 709/207; 709/201; 709/202; 709/203; 709/217; 709/219

(58) Field of Classification Search
USPC ......................................... 709/206, 204, 205
See application file for complete search history.

(56) References Cited

U.S. PATENT DOCUMENTS

| | | | | |
|---|---|---|---|---|
| 6,252,588 B1 * | 6/2001 | Dawson | | 715/752 |
| 2002/0013815 A1 * | 1/2002 | Obradovich et al. | | 709/204 |
| 2003/0049593 A1 * | 3/2003 | Parmer et al. | | 434/322 |
| 2003/0122864 A1 * | 7/2003 | Jenne et al. | | 345/738 |
| 2004/0243423 A1 * | 12/2004 | Rix et al. | | 705/1 |
| 2005/0036157 A1 * | 2/2005 | Takabayashi et al. | | 358/1.9 |
| 2006/0059183 A1 * | 3/2006 | Pearson et al. | | 707/101 |
| 2007/0130369 A1 * | 6/2007 | Nayak | | 709/246 |
| 2007/0157107 A1 * | 7/2007 | Bishop | | 715/771 |
| 2007/0157108 A1 * | 7/2007 | Bishop | | 715/771 |
| 2008/0066130 A1 * | 3/2008 | Elbarky | | 725/110 |
| 2008/0133677 A1 * | 6/2008 | Pattabhiraman et al. | | 709/206 |
| 2008/0162649 A1 * | 7/2008 | Lee et al. | | 709/206 |
| 2009/0031232 A1 * | 1/2009 | Brezina et al. | | 715/764 |
| 2009/0106415 A1 * | 4/2009 | Brezina et al. | | 709/224 |
| 2009/0125612 A1 * | 5/2009 | Rabetge et al. | | 709/220 |
| 2009/0248823 A1 * | 10/2009 | Li et al. | | 709/206 |
| 2009/0271514 A1 * | 10/2009 | Thomas et al. | | 709/224 |
| 2010/0070875 A1 * | 3/2010 | Turski et al. | | 715/748 |
| 2010/0178944 A1 * | 7/2010 | Fodor | | 455/466 |
| 2010/0306185 A1 * | 12/2010 | Smith et al. | | 707/709 |
| 2011/0099380 A1 * | 4/2011 | Vandewater | | 713/176 |
| 2011/0113084 A1 * | 5/2011 | Ramnani | | 709/201 |
| 2012/0239742 A1 * | 9/2012 | Moradi et al. | | 709/204 |

\* cited by examiner

*Primary Examiner* — Rupal Dharia
*Assistant Examiner* — Mohammed Ahmed
(74) *Attorney, Agent, or Firm* — Kilpatrick Townsend & Stockton LLP

(57) ABSTRACT

Systems and methods for advanced e-mail and messaging are disclosed. Profiles which include visual keys enable more efficient communications between users. Profiles may be pushed out to recipients or may be pulled in by recipients, with control over updated elements shared between the profile owner and the recipient. Additional capabilities include the ability to delete e-mails sent to a recipient regardless of when sent, extended subject line support to enable more efficient communications, and Improved display of threaded e-mail messages. Furthermore, features to reduce necessary communications bandwidth are also disclosed.

20 Claims, 20 Drawing Sheets

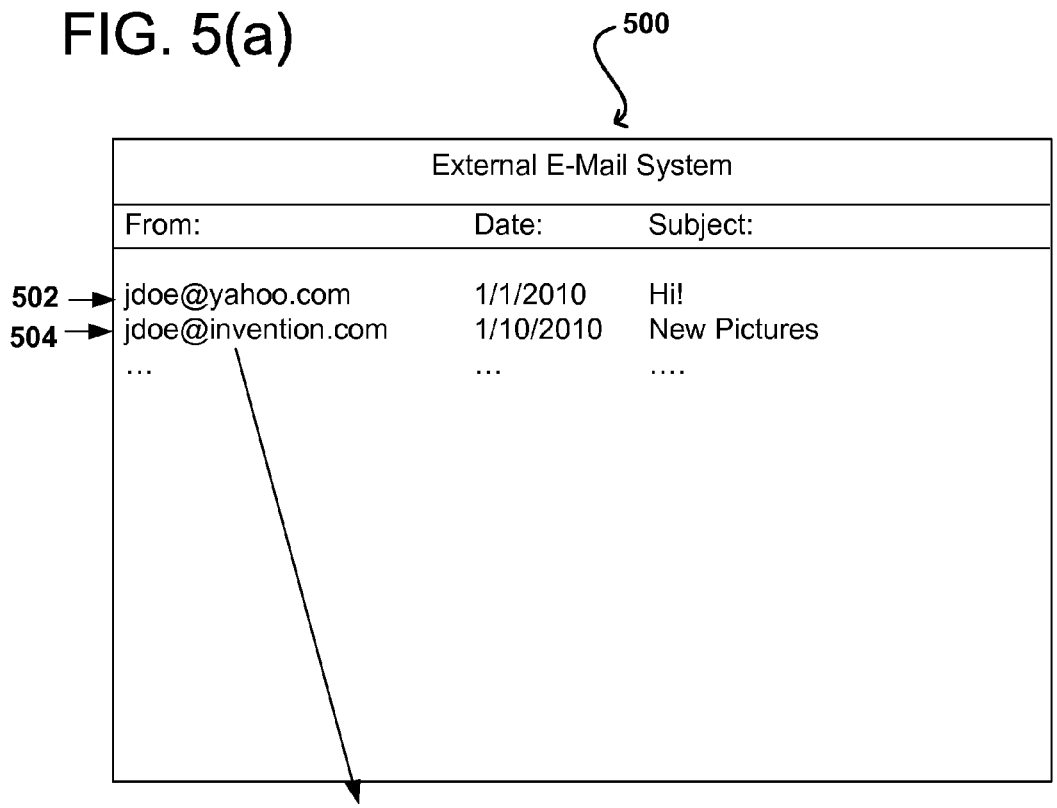
FIG. 5(a)
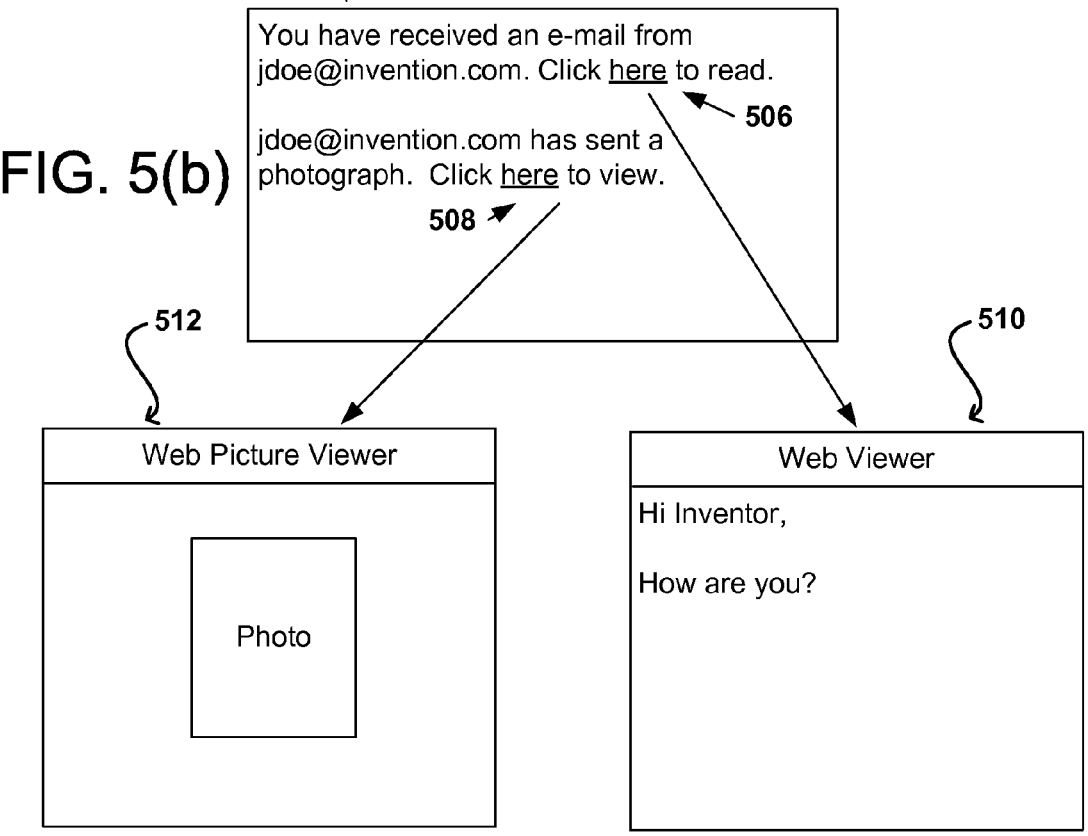
FIG. 5(b)
FIG. 5(d)
FIG. 5(c)

FIG. 7(a)

| External E-Mail System | | |
|---|---|---|
| From: | Date: | Subject: |
| 702 → jdoe@yahoo.com | 1/1/2010 | Hi! |
| 704 → jdoe@invention.com | 1/10/2010 | New Pictures |
| ... | ... | .... |

FIG. 7(b)

706 → Hello. This e-mail is in response to our previous discussion ...<u>Click for More</u>

Hello. This e-mail is in response to our previous discussion last week. I hope you have had time to consider my offer. Please respond

710

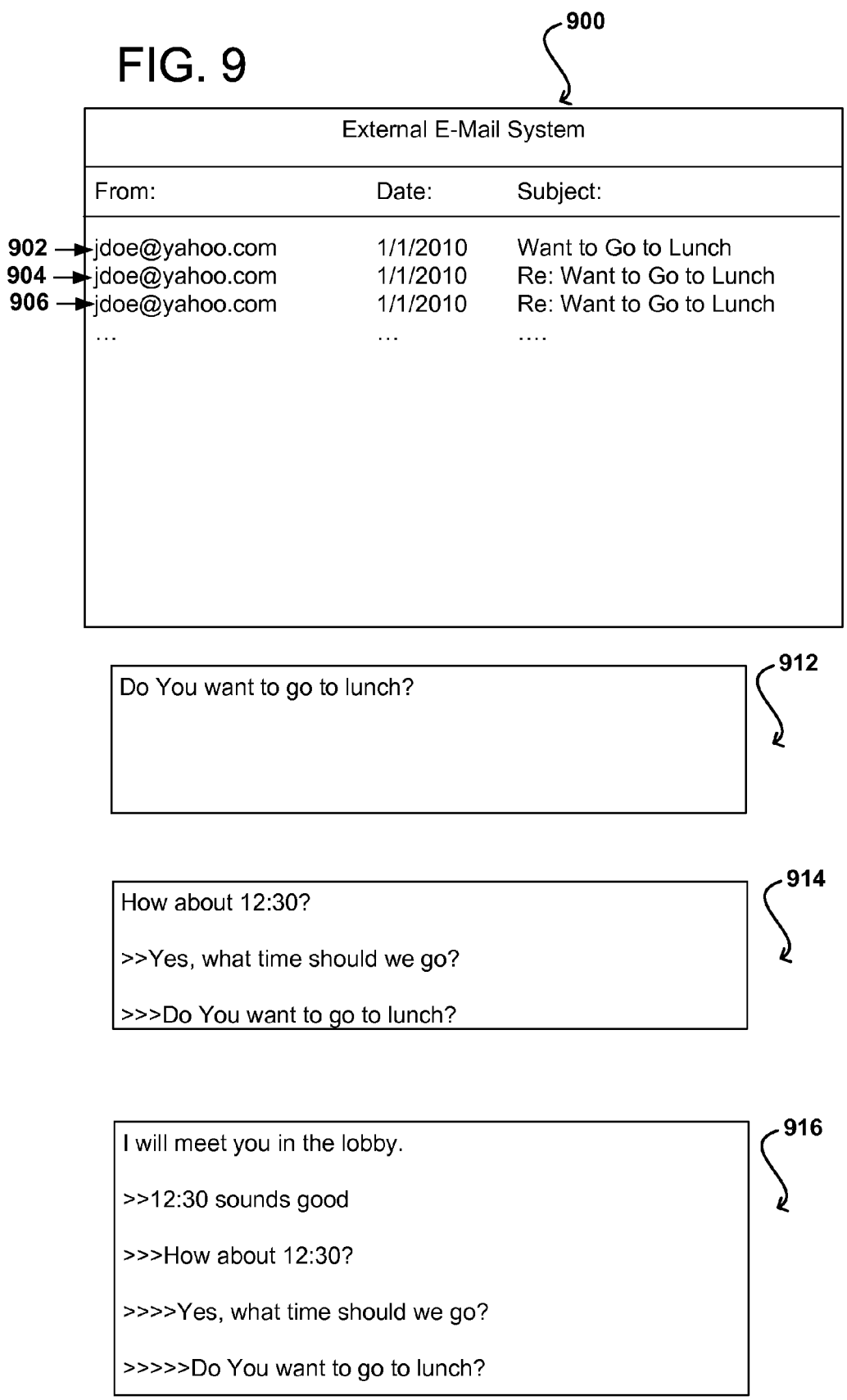

1002 → Bill    1004 → Ted

1006

Hi Bill and Ted. Do You want to go to lunch?

1008

Hi Bill and Ted. Do You want to go to lunch?

1010

Yes, lets go to McDonalds.

>>Hi Bill and Ted. Do You want to go to lunch?

1012

OK, lets go to Burger King.

>>Hi Bill and Ted. Do You want to go to lunch?

1014

Lets Meet at 12:30

>>Yes, lets go to McDonalds.

>>>Hi Bill and Ted. Do You want to go to lunch?

?

1016

Lets Meet at 12:30

>>OK, lets go to Burger King.

>>>Hi Bill and Ted. Do You want to go to lunch?

FIG. 10

ENHANCED E-MAIL AND MESSAGING SYSTEM WITH VISUAL PROFILE AND SELECTIVE UPDATE

CROSS REFERENCE TO RELATED APPLICATIONS

This application is a non-provisional of and claims priority to provisional applications 61/301,032, entitled "E-MAIL WITH VISUAL PROFILE AND SELECTIVE UPDATE" filed on Feb. 3, 2010, 61/367,824, entitled "ENHANCED E-MAIL AND MESSAGING SYSTEM WITH VISUAL PROFILE AND SELECTIVE UPDATE" filed on Jul. 26, 2010, and 61/393,720, entitled "ENHANCED E-MAIL AND MESSAGING SYSTEM WITH VISUAL PROFILE AND SELECTIVE UPDATE" filed on Oct. 15, 2010, the contents of which are hereby incorporated by reference for all purposes.

BACKGROUND

The use of electronic communications, such as e-mail, text messaging, instant messaging, and the like has become ubiquitous. The speed and convenience of electronic communications mechanisms continues to displace more traditional forms of communication, such as telephone calls and paper letters. Electronic communications provided added convenience to parties engaged in communication in both business and social contexts. Furthermore, the nearly instantaneous nature of electronic communications promotes increased efficiencies in some forms of communications. For example, a letter mailed via standard post requires transit time from the sender to the receiver, which can be on the order of several days. In contrast, the transit time of an e-mail or an instant message can be measured in terms of seconds or even portions of a second.

In addition to the continually expanding use of electronic communications, there is also a continually expanding universe of devices in which user's may send and receive electronic communications. In the recent past, user's may have been limited to fixed location devices, such as personal desktop computers, to send and receive electronic communications. In today's environment, the devices used can be both fixed and portable. For example, laptop computers are portable devices which the user may use to access computer networks in order to send and receive electronic communications. Additional examples of electronic devices that can be used to access all forms of electronic communications can include netbook computers, tablet computers, and handheld personal data assistants (PDA). An ever increasing segment of user's may also access electronic communications through devices such as Smartphones, which may contain all the computing capabilities of more traditional computing devices, while at the same time also contain capabilities for making traditional phone calls. The different types of devices used by users to access electronic communications is constantly expanding.

Furthermore, the ability of these devices to access computer networks to send and receive electronic communications is also expanding. In the past, a user may have accessed electronic communications using a fixed line dial up phone connection. The user have used an analog modem to dial the local access number of an Internet Service Provider (ISP) in order to gain access to the network known as the Internet, in order to send and receive electronic communications. Today, the ability to access networks has greatly increased. Portable computers, such as laptops and other devices, may be equipped with wireless technologies that allow the device to connect to the Internet from any location.

For example, Internet Wi-Fi hotspots currently exist in a wide variety of locations, from airports to coffee shops to hotel rooms. A user can typically access one of these hotspots to gain access to the Internet using a portable communications device. In many cases, the access is provided for free or at a minimal cost. In addition, may communications devices are also equipped with wireless access devices that allow the device to gain access to the Internet via the cellular phone network. The cellular phone network may provide Internet access in areas where no Wi-Fi hotspots exist. The cellular phone network may also provide Internet access to a user while he is moving. For example, unlike a Wi-Fi hotspot, where the user is generally stationary, the cellular phone network may provide Internet access while a user is traveling in a car, bus, or other from of ground transportation.

Some wireless communications devices may allow the device to access the Internet via both Wi-Fi hotspots as well as the cellular phone network. The device itself may determine the better, cheaper, or faster connection to the internet and use the appropriate facility.

Access to the Internet is now available even when the user is traveling via air. Many airlines currently offer in flight Internet access which can allow a user to send and receive electronic communications. Although such services may currently require a fee, it is inevitable that users will demand such access as part of the initial ticket price.

As the importance of electronic communications has increased, users demand more and additional functionality from there communications devices. For example, users generally require that communications devices operate simply and reliably, and allow the user to communicate in the most efficient manner possible. Users also desire an easy to use interface on their communications devices. The interface should be customizable by the user in order to let the user communicate in the most efficient manner possible. Furthermore, user communications devices should utilize network bandwidth in the most efficient way possible.

Embodiments of the present disclosure address these issues individually and collectively.

BRIEF SUMMARY

Systems and methods for advanced e-mail and messaging are disclosed. Profiles which include visual keys enable more efficient communications between users. Profiles may be pushed out to recipients or may be pulled in by recipients, with control over updated elements shared between the profile owner and the recipient. Additional capabilities include the ability to delete e-mails sent to a recipient regardless of when sent, extended subject line support to enable more efficient communications, and Improved display of threaded e-mail messages. Furthermore, features to reduce necessary communications bandwidth are also disclosed.

In one embodiment, a method for displaying a sender profile when viewing an electronic communication is provided. The method may comprise: displaying, with a server computer, the electronic communication; displaying, with the server computer, on the same screen as the electronic communication, a profile of a sender of the electronic communication, wherein at least a first portion of the profile is under at least partial control of the sender; and displaying, with the server computer, on the same screen as the electronic communication, the profile of the sender, wherein at least a second portion of the profile is under the complete control of a recipient of the electronic communication.

In a further aspect, the method may comprise: receiving a profile update from the sender; receiving a selection of elements of the profile that are to be updated from the recipient of the updated profile; and updating only the selected elements, wherein the selected elements of the updated profile are displayed to the recipient when an electronic communication is received from the sender. In yet a further aspect the updated profile of the sender is received in response to a request for the updated profile send by the recipient. In one aspect, the electronic communication is an e-mail message. In a different aspect, the electronic communication is an instant message. In an additional embodiment, a non-transitory computer readable medium storing thereon a set of instructions which when executed by a computer processor cause the processor to execute the method is provided.

In another embodiment, a method of recalling e-mail messages is provided. The method may comprise: receiving, at a server computer, an indication of a recipient of an e-mail message that will be recalled; receiving, at the server computer, a selection of e-mails that will be recalled; identifying, in a database, all e-mails that have been sent to the recipient and have been selected for recall; and deleting the identified e-mails from the database.

In one aspect, the method may further comprise: identifying links to the identified e-mails; and deleting the links to the identified e-mails. In addition, a non-transitory computer readable medium storing thereon a set of instructions which when executed by a computer processor cause the processor to execute the method of recalling an e-mail message is provided.

In yet another embodiment, a method of replying to an e-mail message is provided. The method may comprise: selecting, with a server computer, a reply and delete original option; replying to the e-mail message; and automatically deleting, with the server computer, the e-mail message. In a further embodiment, a non-transitory computer readable medium storing thereon a set of instructions which when executed by a computer processor cause the processor to execute the method of replying to an e-mail message is provided.

In yet one more embodiment, a method of displaying an e-mail is provided. The method may comprise: receiving, at a server computer, from a sender, an e-mail message; displaying to a recipient, with the server computer, at least a portion of the e-mail message; displaying to the recipient a link, wherein clicking the link causes the complete e-mail message to be displayed, wherein the compete e-mail message is not sent from the server computer until the link has been clicked. In a further embodiment, a non-transitory computer readable medium storing thereon a set of instructions which when executed by a computer processor cause the processor to execute the method of displaying an e-mail is provided.

In yet one more embodiment, a method of communicating using the subject line of an e-mail is provided. The method may comprise: receiving, at a server computer, an e-mail message from a sender, wherein a length of a subject line of the e-mail message is not limited; wrapping the subject line, with the server computer, onto as many lines as are required to display the subject line in full; and displaying the subject line of the e-mail to a recipient. In one aspect, the subject line includes links to additional content. In a different aspect, the subject line includes formatting capabilities including at least one of underline, bold, italics, and variable font size. In a further embodiment, a non-transitory computer readable medium storing thereon a set of instructions which when executed by a computer processor cause the processor to execute the method of communicating using the subject line of an e-mail is provided.

In yet another embodiment, a method of displaying an e-mail thread within an e-mail system is provided. The method may comprise: receiving, at a server computer, a user selection of an e-mail to be displayed; searching a database which stores all e-mails within the e-mail system to identify all e-mails associated with the selected e-mail; and displaying all of the identified e-mails on a single display screen. In one aspect, the method further comprises: ordering the identified e-mails in chronological order. In a further embodiment, a non-transitory computer readable medium storing thereon a set of instructions which when executed by a computer processor cause the processor to execute the method of displaying an e-mail thread is provided.

A person of ordinary skill in the art would recognize that the embodiments described above are merely exemplary. Various combinations of the embodiments described above would be readily apparent to a person of skill in the art, given the benefit of the present disclosure.

BRIEF DESCRIPTION OF THE DRAWINGS

FIGS. 5(a-d) depict an exemplary external e-mail account.

FIGS. 7(a-c) depict an e-mail with a prompt for more.

FIG. 9 depicts a threaded e-mail display.

FIG. 10 depicts a threaded e-mail display.

DETAILED DESCRIPTION

The use of electronic communications is ubiquitous One use of electronic communications is in the context of online dating. Users of online dating websites typically begin communication through the use of e-mail, prior to engaging in more personal forms of contact, such as phone calls and physical dates. Electronic communications systems today do not provide features that would be useful to users in a dating context. Embodiments of the present invention are directed to electronic communications systems. Electronic communications systems typically are implemented as software running on computer hardware, such as that depicted in FIG. 9. Users typically interact with the electronic communications system using computing devices such as desktop or laptop computers, smartphones, etc.

Embodiments of the present invention provide features that would be beneficial in the context of online dating, although the features may also find use in any number of other applications. Some embodiments provide a visual profile of a sender displayed alongside an e-mail message. This allows the recipient to have a quick reminder about who the sender is. Some embodiments allow a user to selectively update portions of a user profile, such that the user can keep the parts of the profile that he wants to retain. Some embodiments provide the ability to recall e-mail, regardless of how long ago it was sent. Some embodiments provide for a way to pull a sender's profile information, rather than wait for an update. The pulled information can be processed just like a profile update, in that only the portions the user chooses to update are updated.

Some embodiments provide the ability to receive a portion of an e-mail with an indication that more is available. Additional embodiments allow for the complete content of an e-mail to be displayed in the subject line. One embodiment allows for improved message threading, such that the contents of an e-mail thread are presented in a unified way. Some embodiments provide a instant messaging system, wherein a visual profile is provided by the communicating parties. Yet an additional embodiment provides for a more efficient way of replying to an e-mail message. Other embodiments, and combinations thereof, would be clear to a person of skill in the art when presented with the instant disclosure.

Exemplary System

Figure 1:
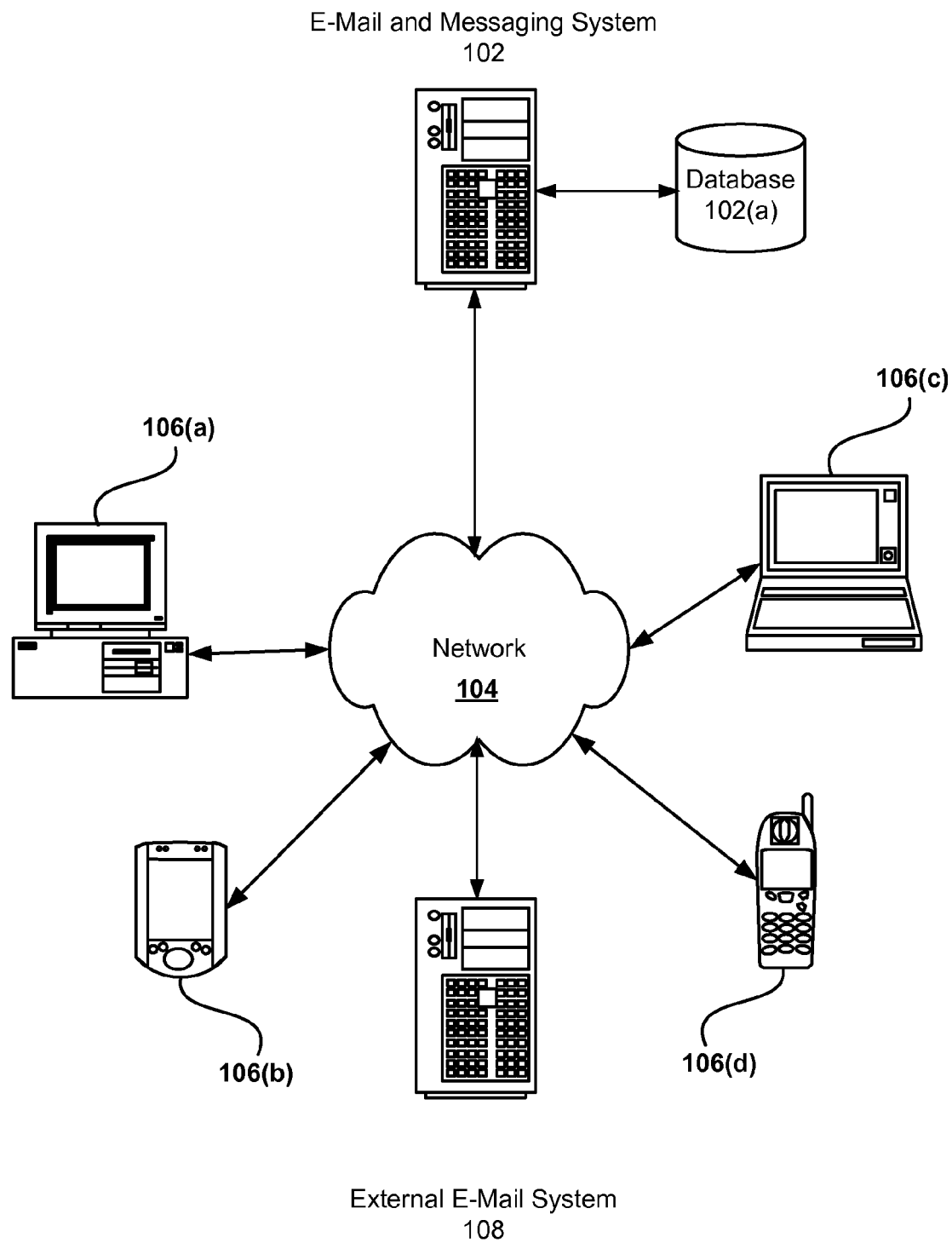
FIG. 1 depicts a system which be used in embodiments of the disclosure.

FIG. 1 depicts an exemplary system that can be used with embodiments of the instant disclosure. System 100 may include an E-mail and Messaging system 102. The E-Mail and Messaging system 102 may include a database 102(a) that can be used to store the profiles, electronic mail messages, threaded messages, and other information that will be described in further detail below. In some embodiments, the E-mail and Messaging system 102 will be a web based system, although the invention is not limited to web based systems. In a web based e-mail system, users 106(a-d) may access the system 102 using a browser running on the user's 106(a-d) access device.

System 100 also includes various user access devices 106(a-d). For example, the system 100 may include a user access device 106(a) in the form of a fixed desktop computer. The system 100 may also include a user device in the form of a PDA 106(b). Additionally, the user access device may be in the form of a portable laptop computer 106(c). As yet another example, the system 100 may include user access devices in the form of a smartphone 106(d). Although several user access devices are described, it should be understood that this is for purposes of explanation, and not limitation. Any number of other user access devices has also been contemplated.

The E-mail and Messaging system 102 and the user devices 106(a-d) may be communicatively coupled with each other via a network 104. In one embodiment, the network 104 is the Internet, although embodiments of the invention are not limited to the internet. Any form of network or communications mechanism that allows the user devices 106(a-d) to communicate with the E-mail and Messaging system 102 have also been contemplated.

In operation, each user may have an account on the E-mail and messaging system. Typically, an account will be identified by an e-mail address used to send and receive e-mail and other forms of electronic communications, such as instant messages. The account will also typically provide storage space within the database 102(a) for maintaining the users account. For example, the user may be provided with an In-box wherein incoming e-mail messages are initially received and stored. E-Mail and messaging system 102 provides the functionality of e-mail systems that would be presently known to a person of skill in the art. Furthermore, E-mail and Messaging system 102 provides additional functionality not present in current systems. This additional functionality will be described in further detail below.

The system 100 may also include an external e-mail system 108. As is known, a user may have multiple e-mail accounts provided by different providers. For example, a user may have an e-mail account provided by G-Mail™ as well as one provided by Yahoo Mail™. Communications between different e-mail systems is known. Embodiments of the present disclosure advantageously provide communications between both users of the E-Mail and Messaging system 102 and external e-mail systems 108. Furthermore, embodiments of the present disclosure advantageously provide additional features that are not currently available in known e-mail and messaging systems. Further description of these features are provided below.

Sender Visual Profile

Figure 2:
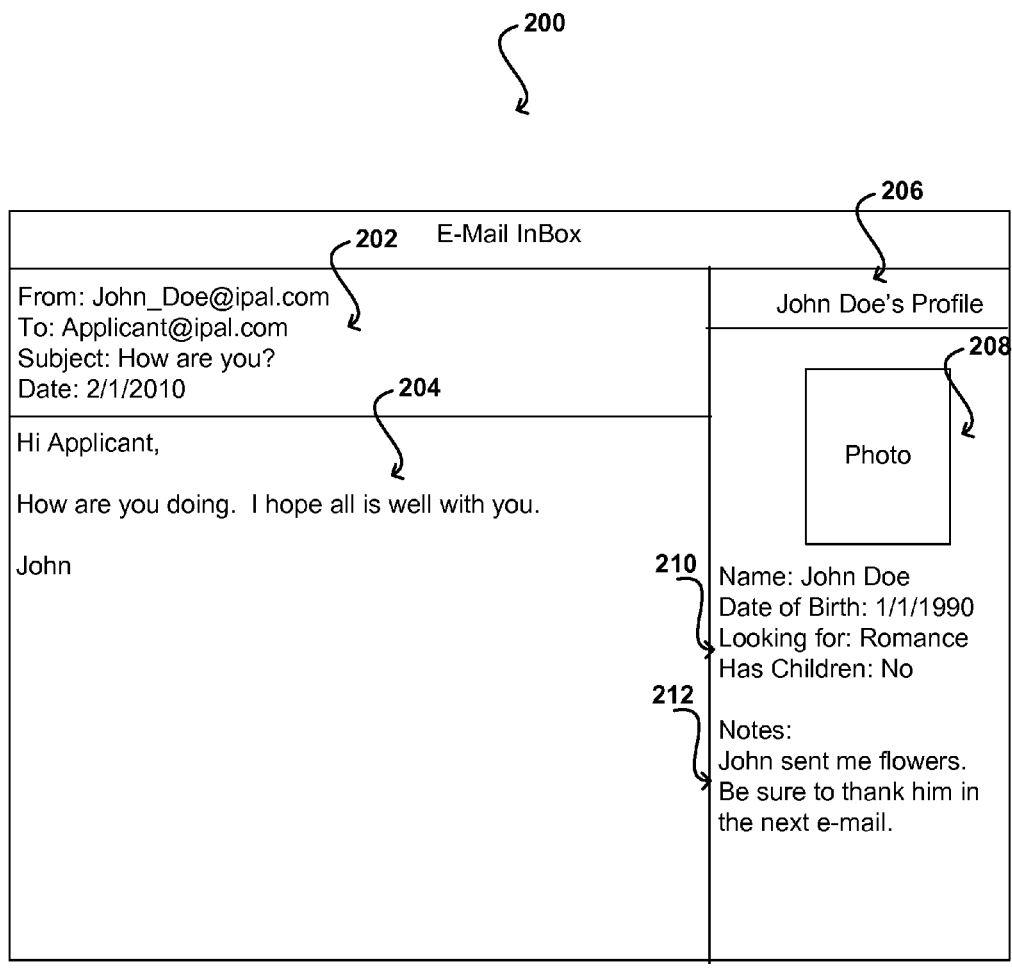
FIG. 2 depicts an e-mail with a visual profile.

FIG. 2 depicts an e-mail with a visual profile. When viewing an e-mail from a sender, in addition to the content of the e-mail message, profile information about the sender can also be displayed. FIG. 2 depicts an e-mail message as it may be viewed by a recipient. It should be understood that the e-mail message as depicted in FIG. 2 is merely exemplary. Embodiments of the present disclosure are not limited to the particular layout as described in FIG. 2. Embodiments of the present disclosure are applicable regardless of the particular visualization of an incoming e-mail.

When viewing an e-mail in accordance with embodiments of the present disclosure, the recipient may be presented with an e-mail reading display 200. The display may include well known elements of standard e-mail readers. For example, the e-mail display may include an address block 202 which contains information about the e-mail. Such information may include the sender's e-mail address, a date the e-mail was sent, the recipient's e-mail address, and a subject of the e-mail message. Embodiments of the present disclosure also include enhancements to the subject line of the e-mail, which will be described below. The e-mail display may also include an area 204 where the body of the e-mail is displayed. The sender may place the content of the e-mail message within the body 204.

In addition to the elements described above, the e-mail display screen may also include a visual profile 206 which displays to the reader, in a visual format, information about the sender of the e-mail. A wide variety of information can be displayed in the visual profile 206. For example, the visual profile may include a picture 208 of the sender. The source of this picture can be either local, in that the picture is selected and stored by the recipient, who then associates the picture with a particular sender. In the alternative, the source of the picture may come from a profile of the sender that is maintained by the sender. Further details regarding the profile of the sender are described below. However, it should be understood that the visual profile information, such as the sender's photograph are displayed right alongside with the received e-mail.

In addition to the visual indicator, such as a picture 208, the visual profile may also contain other information. For example, the visual profile 206 may include demographic information 210 about the sender. For example, as shown in FIG. 2, this information can include the sender's birth date, what types of communications the sender is interested in, marital status, number of children, or any other similar types of information that may be useful to the recipient. Just as above with respect to the picture 208 of the sender, the demographic information 210 of the sender may be provided by the sender himself. The sender may establish a profile within the e-mail system described in FIG. 1. When a recipient of an e-mail from the sender receives the e-mail, the visual profile 206 may be populated with the information provided by the sender in his profile.

Visual profile 206 may also contain an additional area for notes 212 about the sender. Unlike the picture 208 and demographic 210 information described above, the notes 212 section of the visual profile 206 is supplied by the recipient. In the notes section, the recipient of an e-mail may enter additional information that allows the recipient to remember his previous contacts with the sender. The notes section 212 allows the recipient to record information about the sender and have that information readily available whenever an e-mail from the sender is received. It should be noted that unlike the picture 208 and demographic information 210, the notes section 212 is completely under the control of the recipient. Any changes made by the sender to his own profile will have no affect on the visual profile 206 that is presented to the recipient.

In the context of online dating, a user may be in communication with many different potential suitors. Embodiments of the invention advantageously allow for a visual profile 206 of a sender to be displayed alongside the sender's e-mail message. When communicating with many different suitors, it is likely that the recipient may find it difficult to keep track of details of the suitors by an e-mail name alone. By displaying the profile information alongside the e-mail message, the recipient is instantly reminded of who the particular sender is. The profile information can include items such as the sender's photograph, his name, date of birth, or any other biographic type information.

In some embodiments, the profile information is provided by, or is retrieved from, the sender himself. This will be explained in further detail below. In addition to providing the sender's contact information, the profile can also include the ability for the recipient to add notes to the profile. For example, as depicted in FIG. 2, the recipient has added a note 212 that this sender has sent flowers to the recipient, and should be thanked. When dealing with many potential suitors in the context of a dating website, the ability to create notes 212, and have those notes immediately accessible when responding to e-mails can be very useful. For example, a recipient could keep notes as to what personal details have been shared with each sender. When an e-mail is received, that information is displayed alongside the received e-mail. Thus, when responding to the e-mail, the recipient can take into account what personal information has already been shared.

In addition, in a dating context, the notes 212 section can also be used to remind the recipient of previous interactions he has had with the sender. For example, two users of a dating website may have been communicating via e-mail for a long period of time. During this period of time, personal information may be exchanged. The recipient may use the notes section to memorialize pieces of this personal information for later use without having to go back to previous e-mails to retrieve the data. For example, the sender may have told the recipient that her favorite color is blue in an e-mail sent many months ago. The recipient may make note of this fact in the notes 212 section. If during later communication, the subject of favorite colors comes up, then recipient would have the sender's favorite color readily available, without having to search through previous e-mails to find this information (assuming the recipient can even remember that this information is contained in a prior e-mail).

Although the visual profile has been explained in a dating context, it should be understood that embodiments of the invention have applications in any number of other contexts. For example, in a business context, the profile information can include the sender's business profile information. The notes section may include items for follow up of a business nature. For example, the notes information could include an item such as, "In last e-mail, I offered to sell 100 units at $1.00. Check if offer is acceptable." When the next e-mail is received from the sender, the notes will be displayed alongside the e-mail, and the recipient can be reminded to ask about the progress of the sales offer.

Embodiments of the disclosure advantageously keep sender profile information needed by a recipient conveniently associated with an e-mail. The recipient is no longer forced to hunt through prior e-mails in order to recall necessary information, but rather the information is conveniently presented whenever an e-mail from a particular sender is received.

Sender Initiated Profile Updates with Selected Update and Archive

Figure 3:
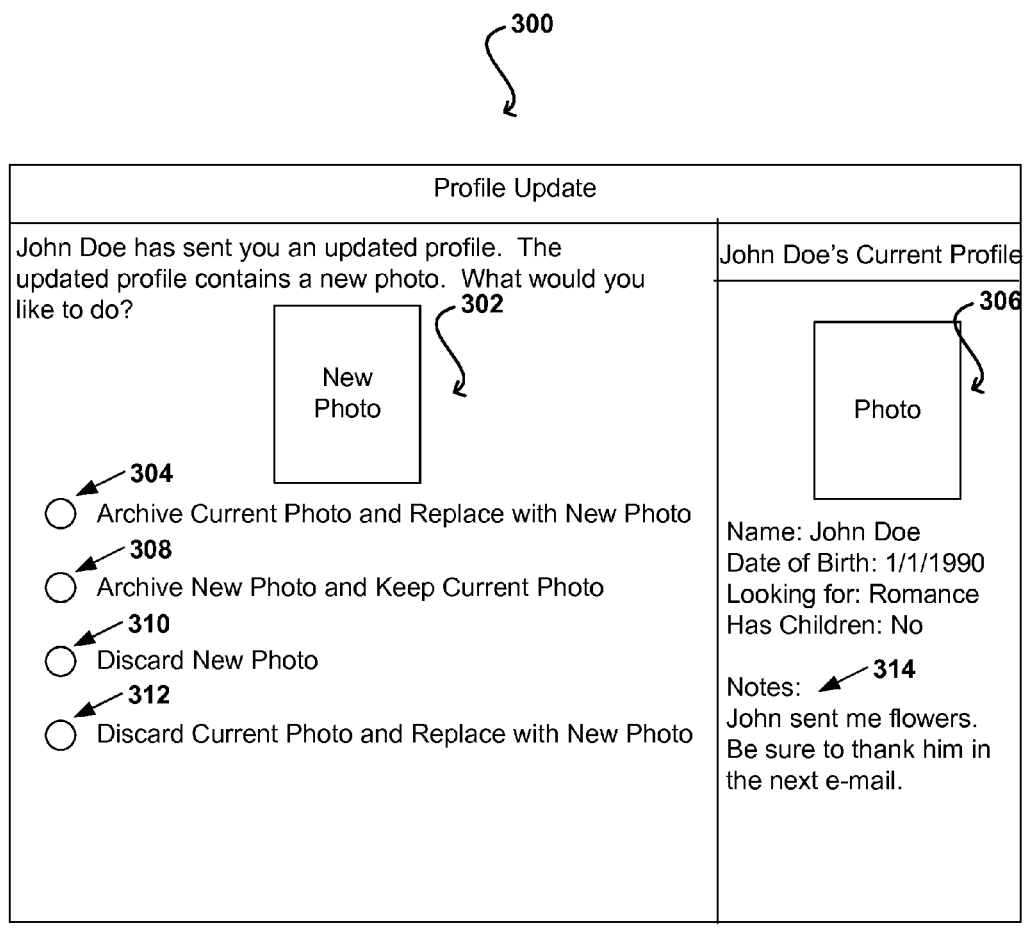
FIG. 3 depicts an exemplary sender initiated profile update.

FIG. 3 depicts an exemplary sender initiated profile update as would be received by a recipient. As mentioned above, a sender may maintain a profile containing information about himself, such as a picture and biographic data, on the e-mail system described in FIG. 1. For example, this profile information may be stored in the database 102(*a*) as described in FIG. 1. The information contained in the profile may then be displayed to a recipient whenever an e-mail is received, as was described with respect to FIG. 2.

In some cases, a sender may wish to update his profile information. For example, the sender may wish to update his profile picture, or certain biographical information. FIG. 3 depicts a case where a sender has chosen to update his profile picture and send notification of the update to selected recipients. The sender may send this update to any of his contacts. FIG. 3 depicts an exemplary screen of a recipient who has received notification of an updated profile picture from a sender.

In prior systems that utilize user profiles, profile information is entirely controlled by the owner of the profile. For example, in the vCards system as provided by Microsoft Outlook, a sender may send an updated vCard, which may include a picture, to people on his contact list. When a recipient receives the updated vCard, the information contained therein automatically replaces the information that was contained in the previous profile. Such an automatic update is not desirable to the recipient, as he loses all control of the information that is updated. Embodiments of the present disclosure advantageously allow the recipient to maintain control of the information in a sender's profile.

Unlike vCards, a recipient of an updated profile remains in control of which information is updated. For example, in FIG. 3, the recipient is notified 300 that sender John Doe has sent 302 an updated profile picture. However, the recipient may not wish to use the new profile picture, because he prefers an older one. In prior systems, the picture would be automatically updated, and the recipient would have no control over this update. Embodiments of the present disclosure provide the recipient with several options when an updated profile is received. For example, the recipient can choose 304 to archive the current photo and replace the visual profile picture 306 with the updated picture. In the alternative, the recipient may choose 308 to archive the updated picture, and keep using the current picture. The ability to archive a picture is described in further detail below. The recipient is thus given the option to keep using the current profile photo and discard the new photo. The recipient is also given the option of keeping the new photo and discarding the current photo.

Additionally, the recipient may choose 310 to simply keep using the current picture, and discard the new picture. If the recipient chooses this option, he may no longer have the new picture available for use. However, as will be described below, it is not necessary for the recipient to discard the new picture, even if he wishes to continue to use the old picture. Similarly, the recipient may choose 312 to discard the current photo, and replace it with the new picture, without archiving. Again, when choosing this option, the recipient will no longer have the older photo available for use. Thus, if the recipient is ever unsure of the need for maintaining the previous photo, he can simply shoos to archive the previous photo.

As mentioned above, embodiments of the present invention also allow for the ability to archive pieces of profile information. For example, sender John Doe has sent an updated profile picture. The recipient may wish to update John Does profile picture, but does not wish to discard his current profile picture (e.g. the recipient likes the current picture, and wants to save it). Likewise, the opposite situation can occur in that the recipient likes the old picture, but does not wish to delete the new picture. Embodiments of the present invention allow for the user to archive profile information. These archives can be referred to as albums. As described above, the recipient can archive all of the received profile update photos from the sender. The recipient can then choose which profile picture to use for the sender. The choice of which picture to use can be made as often as the recipient wishes, and is independent of the sender. Because all of the profile information for the sender is maintained in the database 102(*a*) described with respect to FIG. 1, the profile pictures of the sender can be maintained.

Although the above example is presented in terms of an updated photo portion of a profile, it should be understood that the selective update applies to all aspects of a profile. For example, if the sender profile includes a new phone number, the recipient may wish to keep the old phone number. It should also be understood that the selective profile update does not impact any notes 314 that the recipient has entered into the sender's profile. Thus, portions of the sender's profile can be updated at the discretion of the recipient. Although this feature gives a great deal of control to the recipient in maintaining old profile elements, such as pictures, of sender's, embodiments of the disclosure described further below will alleviate any concerns that senders may have about the loss of control of their profile information.

E-Mail Recall

As is well known, humans at times act in haste without thinking through the full consequences of their actions. Such is especially true in the context of e-mail communications. A user may send an e-mail while angry, sad, or in an altered state (e.g. inebriated). Often, the user regrets sending the e-mail as soon as the button to send the e-mail is clicked. In some cases, after further reflection or after having returned to an unaltered state, the user cones to the realization that he should not have sent the e-mail. With typical e-mail systems, once the user has decided to send, there is little to no recourse.

In the context of internet dating, the permanence of e-mail can inhibit open and honest communication between dating partners. For example, a person may engage in a series of e-mail communications with a partner over a period of time, lasting from days to months, or even years. The person may be unwilling to reveal intimate details about themselves for fear that the relationship may take a turn for the worse, and those e-mails would remain in the possession of the recipient.

Some e-mail systems, such as the one offered by G-Mail offer a service to prevent sending e-mail when in an altered state. For example, "Mail Googles" offered by G-Mail requires a user to enter answers to questions, such as math questions, that would be difficult or impossible for an inebriated person to answer, prior to sending an e-mail. The theory being if a sender is unable to answer the questions, he should not be sending an e-mail.

Although such a system has its uses, it is ineffective for e-mails that have already been sent and read by the recipient. Embodiments of the present invention provide for the ability to delete e-mail messages that have been sent, regardless of how long ago the e-mail was sent. The e-mail messages will be deleted from the recipient's e-mail account. Although the e-mail recall does not alleviate the fact that the message may have already been read by the recipient, it does make it more difficult for the recipient to make further use of the e-mail, because it has been removed from their e-mail account. For example, the recipient may no longer forward the e-mail to others, which could cause embarrassment to the original sender.

Figure 4:
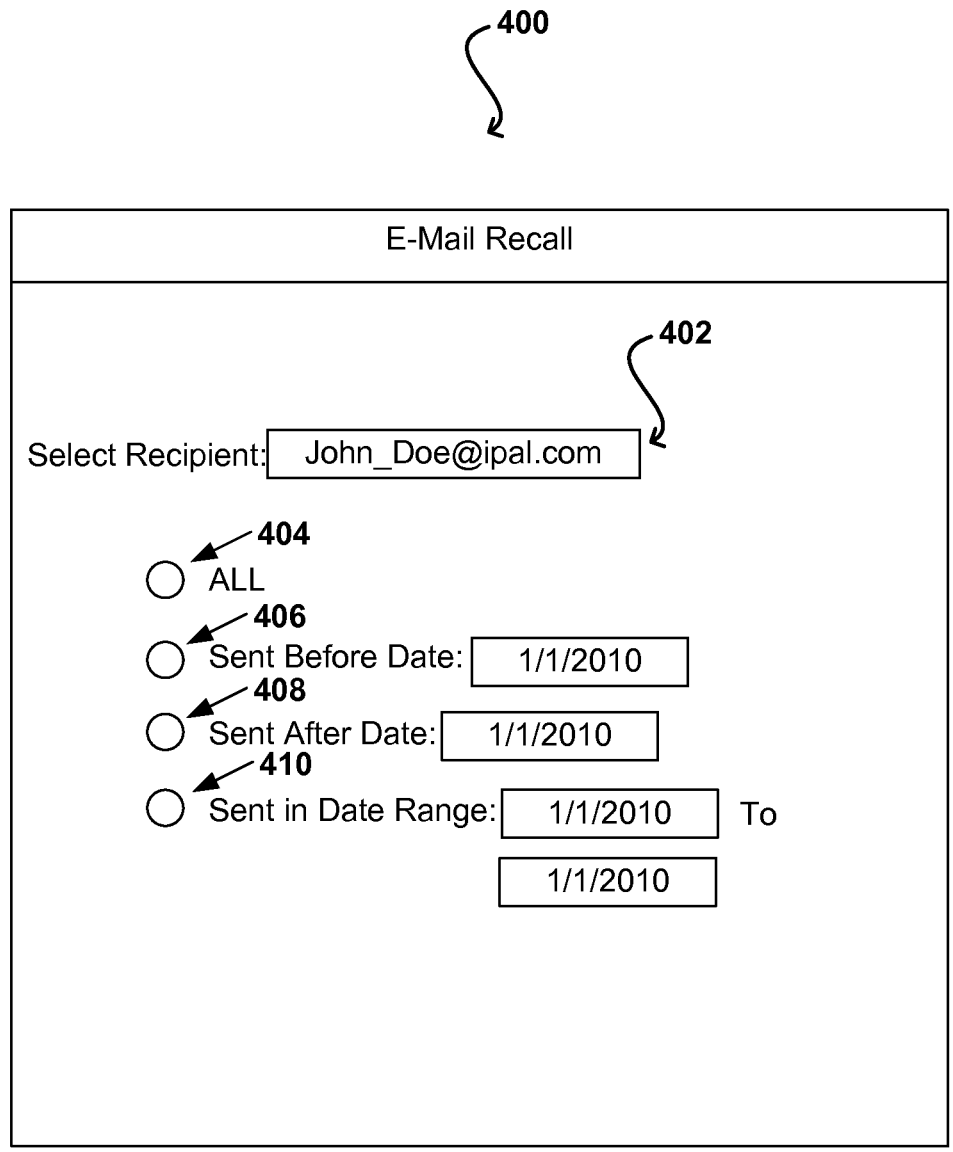
FIG. 4 depicts an exemplary e-mail recall screen.

FIG. 4 depicts an exemplary e-mail recall screen. For purposes of explanation, imagine a scenario where two dating partners have been engaged in an e-mail conversation over a period of several months. At some point in time, one of the partners may decide the relationship is not worth continuing, and wishes to break off the relationship. During the course of the relationship, e-mails may have been exchanged which the sender would prefer not remain in the possession of the recipient. For example, e-mails with intimate details about the sender. Although it is too late to prevent the content from being shared with the recipient, as he may have already read the e-mails, the e-mail recall feature can prevent further use of the e-mails. For example, the recipient will no longer be able to read or forward the received e-mails.

In the exemplary recall screen 400 of FIG. 4, the sender may enter a particular recipient 402 to recall e-mails from. The sender may enter the e-mail address directly into a dialog box 402, or may select a list of recipients from a drop down selection box. In some embodiments, the sender selects an e-mail address from their contacts list. The sender then selects which e-mails are to be recalled. For example the sender may select "all" 404 which indicates that all e-mails from the sender to the selected recipient should be recalled. Similarly, the sender may select a date range, such as e-mails sent before a specified date 406, after a specified date 408, or during a date range 410. Any other combination of selection of e-mails to be recalled, including the selection of an individual e-mail or selection of e-mails, has been contemplated.

After specifying which e-mails are to be recalled, the e-mail system can delete the selected e-mails from the recipients e-mail account. To the recipient, it will appear as if the e-mails had never been received. As mentioned above, this does not alleviate the fact that the e-mails may have already been read by the recipient, but it does prevent the recipient from making further use of the messages. Such a deletion of previously sent e-mails is possible because the e-mails in the system are not stored on the recipient's access device 106(*a-d*), but rather are stored within the database 102(*a*) of the e-mail system. The ability to delete these message only requires the e-mail system 102 to search through the database 102(*a*) and select the identified messages. These message can then be deleted from the database 102(*a*), thus preventing further access by anyone, including the recipient.

As should be clear, any information contained in a recalled e-mail is no longer available for the recipient to use. For example, if the sender included pictures as an attachment in a sent e-mail, once that e-mail is recalled, the entire e-mail, including the attached pictures is deleted from the database 102(a). Thus the attachments are no longer available for use by the recipient.

In addition, profiles that the sender has sent as a profile updates may also be recalled. Again, although this does not alleviate the fact that the recipient may have already seen the photo, it at least prevents the recipient from further viewing or use of the photograph. The process of recalling an updated profile is very similar to recalling an e-mail. Again, as the sender's profile is stored in the database 102(a), recalling an updated profile is a matter of searching the database 102(a) for the profile that is desired to be recalled and then deleting the profile. Even if the recipient has chosen to archive the updated profile information, this still does not prevent a recall of the profile information. As mentioned above, profile information, including that which is archived by a recipient, is stored in the database 102(a). When a recipient chooses to archive certain portions of profile data, that archived data is still stored in the database 102(a). Thus, the e-mails system 102 still has access to the archived data, and can delete the archived data as necessary.

It should be clear that if both the sender and recipient of e-mails and photographs use the e-mail system of the present invention, recall of e-mail or photographs simply requires the e-mail system to search out and delete all relevant e-mails and photographs from the system database 102(a). The problem becomes more complex when the sender is a user of the present e-mail system, while the receiver is a user of a different e-mail system. For example, the receiver may use a third party e-mail system, such as G-Mail. In such a case, once the e-mail or photographs has been sent to the recipient, the sender's e-mail system loses the ability to directly recall old e-mail and photographs, because the data is no longer contained within the e-mail system 102.

Embodiments of the present invention advantageously overcome this problem by not sending e-mail or photographs directly to external e-mail systems. Rather than sending the content of the e-mail, or attachments, such as photographs, to the external e-mail system, a link, such as a web link, to the content is sent instead. A sender using the e-mail system of the present invention would address an e-mail directed to an external system just as he would any other e-mail message. The e-mail system would determine that the message is intended for an external recipient. Rather than sending the e-mail, the e-mail system will put the contents of the message, including any photographs into one or more web pages that is stored on the e-mail system 102 in database 102(a). A recipient using un external e-mail system will then receive an e-mail containing links to the content, as opposed to the content itself.

The e-mail system then creates a new e-mail message that contains links to the previously created web pages. This e-mail with the links is then sent to the intended recipient. The recipient receives the e-mail, and can click on the links to view the message or photographs. What should be understood is that the actual content of those links is maintained by the e-mail system of the present invention. Thus, if a sender chooses to execute the e-mail recall function, the e-mail system of the present invention simply disables the links. For example, the links could be deleted on the e-mail system, such that if the recipient later clicks on the link, he will get a well known "Not Found" error message. In the alternative, the content pages could be replaced with a page that informs the recipient that the content was deleted (such that the recipient does not think there is a problem with his own computer). For example, after clicking on the link, the recipient may be presented with a page that says, "The sender of the e-mail no longer wishes for you to be able to read this message."

FIG. 5(A) depicts an exemplary inbox 500 of a recipient who uses an e-mail account external to the e-mail system of the present invention. As can be seen, two messages are shown in the inbox. The first 502 may be a regular message, which when clicked would appear as normal. The second message 504, from jdoe@invention.com, is an e-mail sent from the e-mail system of the present invention.

When the recipient opens the e-mail message, rather than seeing the contents of the message directly, he will see links. FIG. 5(b) depicts an exemplary e-mail sent from a user of an e-mail system of the present disclosure to a user of an external mail system. Rather than seeing the actual contents of the original e-mail, the recipient may simply see an e-mail that contains links to the content. For example, assume that the sender has sent an e-mail to a recipient whose account resides on an external e-mail system. The e-mail may contain a message and an attached photograph. When the recipient receives and opens the message on the external e-mail system, he is presented with two links. The first link 506 is a link to the content of e-mail message itself. The second link 508 is a link to the attached photograph.

The user may then click on the links contained in the e-mail. Upon clicking the links, a new page, such as a web page, may open in the recipient's web browser, and the original content is displayed. FIG. 5(c) depicts a screen 510 that shows what may be displayed in the recipients web browser upon clicking link 506. Once the recipient clicks the link, the recipients web browser is directed to a web site hosted by the e-mail system 102. The e-mail system 102 then may place the contents of the original e-mail into a web page and send the web page to the recipients browser. A similar situation occurs should the recipient click on the link 508 in order to view the attached photograph.

It should be understood that the content is being served from a system associated with the e-mail system of the present invention. Thus, what is displayed when the links are clicked is entirely up to the e-mail system. If the original sender decides to recall the message, then the links can simply be disabled (either by deleting the content as stored or replacing the content). The e-mail system advantageously allows for recall of e-mail messages and attachments even when those messages and attachments are sent to external e-mail systems. Recalling an e-mail sent to an external system is just a matter of effectively disabling the links in the e-mail that is sent to the external e-mail system. Effectively disabling the links can include removing the previously linked content or replacing the previously linked content with substitute content.

Retrieve Updated Profile

As described above, embodiments of the invention provide for systems and methods of handling updated profile information that is sent from a sender to a recipient. Portions of the updated profile can be accepted, discarded, or archived. In addition to processing received profile updates, embodiments of the invention also allow for an on demand update of a profile.

Users of the e-mail system may create their own profiles. As explained above, the users may send these profiles to selected recipients. However, in some cases the users may not wish to actively select which recipients to send updated profile information to. Embodiments of the present invention allow a user to create or update a profile. Other users who wish to obtain the updated profile information can select an option to retrieve the latest user profiles.

Figure 6:
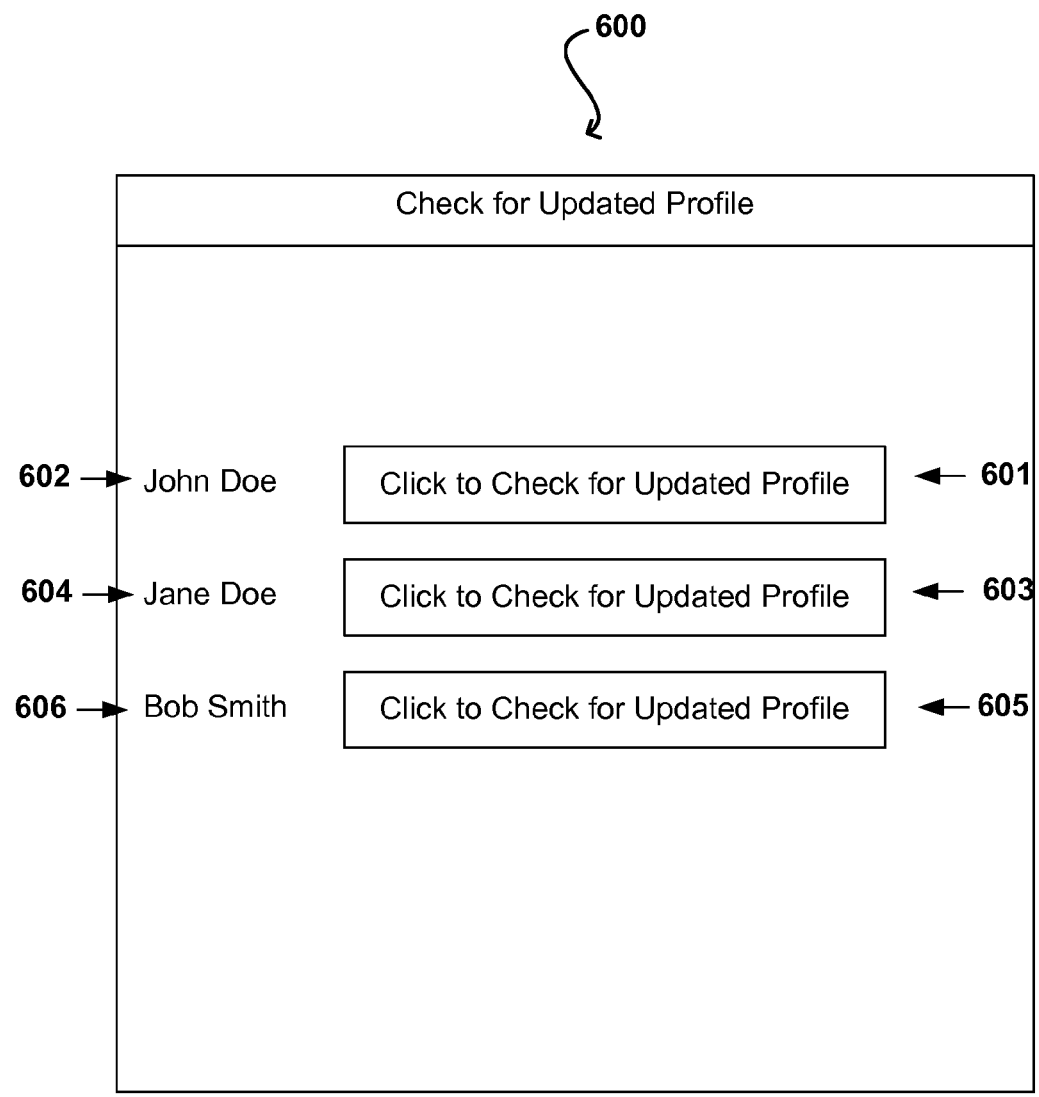
FIG. 6 depicts an exemplary contacts page.

FIG. 6 depicts an exemplary contacts page 600 for a user of the e-mail system. As can be seen, the user depicted in FIG. 6 has three contacts 602, 604, 606 in their contacts list. For each contact, the user may click a button 601, 603, 605 corresponding to the user in the contacts list that allows the profile information for the contact to be updated. Just as described above with respect to FIG. 3, once the user has clicked on the retrieve updated profile button, the user is given the option of which profile elements to update, discard, or archive. In some embodiments, the ability to update a contact's profile information is limited to those with whom an e-mail exchange has already occurred, while in other embodiments any user's profile information can be retrieved at any time.

The ability for a profile to be "pulled" from the user's e-mail account provides the advantage that the user need not "push" out updates to all of his contacts. Unlike prior systems, such as vCard, which requires a user to manually notify his contacts of an updated profile, embodiments of the present disclosure advantageously shift this responsibility to the recipient. In many cases, in prior systems, the sender is forced to notify everyone in his contacts list that an updated profile is available. This mass update is not only inefficient, but can also be a waste of time for the recipients. In some cases, the recipient of an updated profile notification may not be in active communication with the sender. For example, the recipient may have discontinued communications with the sender months or years ago and no longer desires profile updates. In prior systems, the recipient would still receive the updated contact information from the sender if the sender chose to send the updated profile information to everyone in their contact list.

Furthermore, in many cases the sender may not want to go through the effort of identifying the people in his contact list that should retrieve updates. In prior systems, in order to avoid sending a mass mailing to everyone in the sender's contact list, the sender would need to manually go through their contacts, and individually select recipients that should receive the updated profile information. This form of updating profile information requires a great deal of time and effort on the part of the sender.

Embodiments of the present disclosure advantageously relieve the sender of the need to go through his contact list and select recipients to whom updated profile information should be sent. Embodiments of the present disclosure also advantageously relieve recipients from receiving updated profile information from users they no longer care about. The user who is updating his profile can simply update his profile and does not need to go through any additional steps. Those contacts that wish to obtain the latest profile information can choose to click a button to obtain the latest information.

As mentioned above, the updated profile information can still be selectively updated by the recipient. In other words, even though a sender may have a new profile available, it is up to the recipient as to which profile elements should be saved, discarded, or archived. Thus the recipient still maintains some control over the updating of the sender's profile. Furthermore, embodiments of the present disclosure advantageously allow the recipient to selectively update particular elements of a profile. Unlike prior systems, in which an update of a profile causes all elements of the profile to be updated, embodiments of the present disclosure only update those profile elements selected by the recipient.

E-Mail with Prompt for More

As described with references to FIG. 4, one feature of the improved e-mail system is that an e-mail can be sent which contains links to the content of the e-mail. As explained above, this feature facilitates the ability for a user to later recall the e-mail by deleting the content associated with the link. Although the description above was presented in terms of a user using an external e-mail system, it should be understood that sending the contents of an e-mail as a link could also be applicable when both the sender and recipient of an e-mail are using embodiments of the present disclosure.

FIG. 7(a-c) depicts a feature of the enhanced e-mail system wherein only a portion of the content or body of message desired to be sent is included in the e-mail body. FIG. 7(a) depicts an exemplary inbox of a user's e-mail account. As shown, the user has two messages 702, 704 in his inbox. The user may then click on one of the messages in order to read the e-mail.

FIG. 7(b) depicts an e-mail reading screen according to an embodiment of the present disclosure. Once the user has clicked on e-mail message 704, the e-mail message may open as depicted in FIG. 7(b). As shown in FIG. 7(b), the first several words 706 of the total e-mail message are included in the body of the e-mail. A link 708 is then provided which, when clicked by the recipient, directs the recipient to a page that displays the entire e-mail.

If the receiver wishes to read the rest of the message, he can then click on the link 708, and will be directed to a page that contains the complete message. FIG. 7(c) depicts a screen that may be presented to a user after he has clicked on link 708. As shown, the user can now see the complete e-mail message 710. It should be clear that if after reading the partial message as shown in FIG. 7(b), if the user decides he does not wish to read the remainder of the message, he simply need not click on the link 708.

Embodiments as depicted in FIG. 7(a-c) have several advantages. In the embodiments as depicted in FIG. 3(a), the receiver is only notified that he has received a message from a sender, and he needs to click on the link to read any portion of the message. Thus the receiver has no idea what the contents of the message are prior to clicking on the link. Embodiments such as the ones depicted in FIG. 7(a-c) advantageously allow the receiver to at least get an idea of what the content of the e-mail is prior to clicking on the link 708, to retrieve the complete message. In some cases, after reading the first few words of the e-mail, the receiver may decide he has no desire to read the rest of the e-mail. As such, he is saved the time of clicking the link, and retrieving a message he has no desire to read.

As yet another advantage, the embodiment as depicted in FIG. 7(a-c) not only save the receiver time in reading undesired messages, it may also save the user money. As is becoming more and more common, users are reading their e-mails through portable devices, such as Blackberries and I-Phones. In some cases, the users of these devices may pay a fixed monthly charge that allows them to download a fixed amount of data. For example, for $25.00 a month, a user may be allowed to download 500 megabytes of data. In some cases, if a user goes above this allocated amount of bandwidth, the user is charged excess usage fees, which can be significant.

By allowing a user to view a portion of the e-mail message prior to downloading the full message, the user may be able to better utilize his available bandwidth. For example, if a message is completely unwanted, the user can simply skip clicking on the link 708 to retrieve the full message. Although the user used some bandwidth to retrieve the partial message, there is still a savings over retrieving the full message. In some cases, a user has access to his e-mail from multiple places, such as through both a home computer and a portable device. Typically, there are no bandwidth restrictions when using the home computer. The user may advantageously use the portion of the e-mail message displayed to make a determination if the complete message should be downloaded to the portable device, or if it can wait until later, such as when the user accesses his e-mail from home.

In addition to providing the user with the advantage of being able to manage his bandwidth usage, the present enhanced e-mail system is also advantageous to the providers of the networks, both wireless networks in the case of portable devices, or the internet in general. When sending an e-mail, the sending e-mail server need only transmit the short portion of the message, and a link. The entire message need no be sent anywhere outside of the sending e-mail system. It is only upon receipt of an indication that the recipient actually wishes to read the entire message that the entire message is sent from the sending e-mail system. Thus, bandwidth that was previously used for sending the complete e-mail is now available for other uses.

Although this feature may be similar to ones found on portable devices such as blackberries, where a portion of the message is sent, with an indication that there is more available, embodiments of the present invention provide the additional advantage discussed above. Mainly, in devices such as the blackberry, a complete e-mail is sent from the sending mail server to the blackberry system. The blackberry system then sends a portion of the message, as well as a link to retrieve the remainder of the message. However, this situation does not resolve the fact that the entire message was first sent to the blackberry system. In other words, although the blackberry system may save wireless bandwidth by not initially sending the complete message to the portable device, this still does not resolve the problem that the complete message still occupied bandwidth when being sent to the blackberry system.

Multiple Line E-Mail Subject

Embodiments of the invention provide for yet additional features for saving an e-mail user time and money. As described above, efficient utilization of bandwidth is advantageous, particularly in mobile environments. Furthermore, saving an e-mail recipient time when reading his e-mails is also advantageous.

In many cases, the content of an e-mail can be relatively short, yet cannot fit in the subject line of an e-mail. For example, most popular e-mail programs have limited the length of the subject field of an e-mail to a predetermined number of characters, such as 256 characters. Furthermore, most popular e-mail readers do not provide for the ability of wrapping the text of the subject line of an e-mail. Thus, even if an e-mail subject is shorter than the arbitrarily selected length of most e-mail programs, the entire subject line will typically not display on the users screen.

For example, some popular e-mail systems limit the length of a subject line to no more than 60 characters. Furthermore, even if the e-mail system allows for somewhat longer lengths of subject lines, most e-mail readers will either truncate the displayed subject line, such that only a single line of text is displayed. In some cases, the e-mail reader may place scroll bars on the subject line, but this still does not resolve the fact that the subject line is limited in length.

Figure 8:
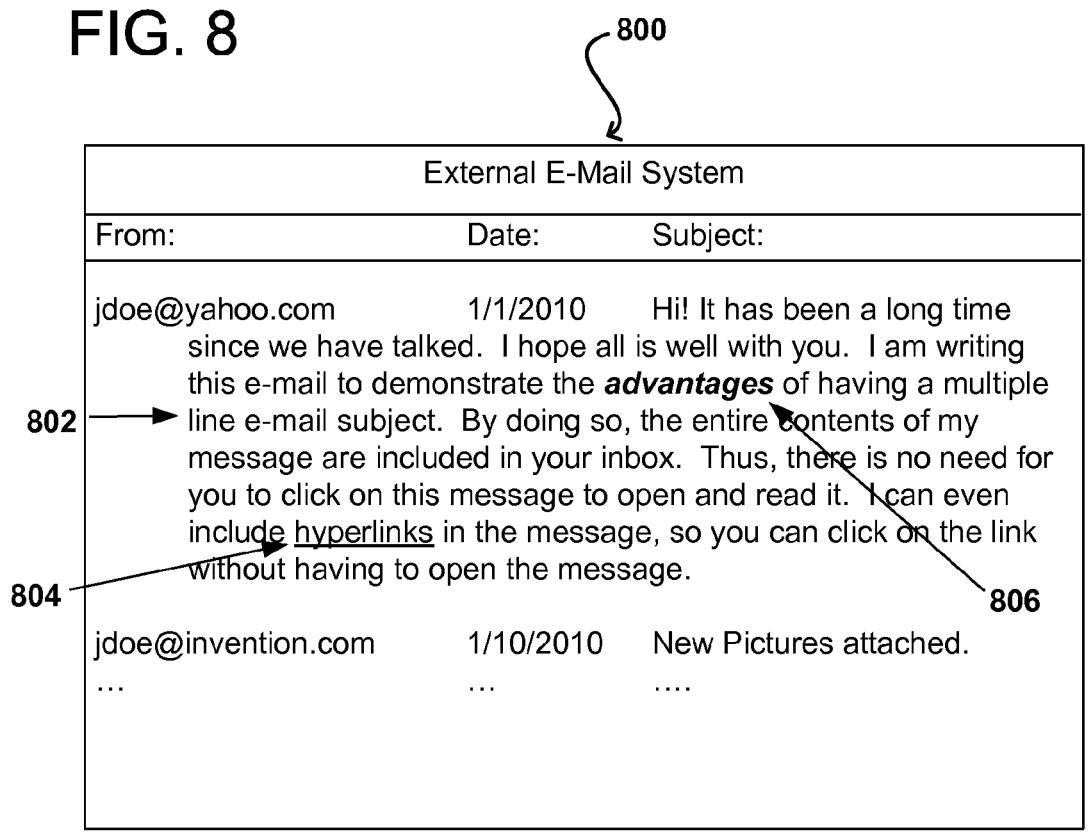
FIG. 8 depicts an e-mail with a multiple line subject.

Embodiments of the present invention overcome this problem in two ways, as depicted in FIG. 8. First, the length of the subject line 802 is not limited to an arbitrary length. The subject line can be as long as desired, or at least as long as the initial e-mail could have been. Second, the subject line will wrap across multiple lines 802 if necessary. Thus, the entire subject line will be displayed using as many lines of text as is necessary.

Embodiments of the invention utilizing multiple line subject lines as depicted in FIG. 8 offer several advantages. First, in cases where the overall message that is being sent is not overly long, the entire message can be included in the subject line. Thus the user is able to simply read the subject line of the message in his inbox, and this conveys the entire content of the message. The user is not forced to go through the extra step of clicking on the e-mail and having to open up the e-mail separately in order to read the contents. This is advantageous to the user, because he can be more efficient by avoiding multiple steps to read an e-mail. Furthermore, this allows for efficient use of network bandwidth, as the entire contents of the e-mail are sent when the list of message in the recipients inbox is sent. The additional step of the user clicking on the e-mail, and then downloading the complete message is no longer required, thus saving bandwidth.

Because the user is able to read the entire message as part of the subject line, there are also advantages to the network provider. In prior systems, the user would read the subject line, decide if he wanted to read the message, then click the message, which would send a request for the message to the e-mail system. In embodiments according to FIG. 8, the step of requesting the message is eliminated thus reducing the load placed on the network. This elimination of extra communication with the network is especially helpful when e-mail is being read using a portable device. Although the total amount of data sent may be the same, the advantage comes from the ability to reduce the connection overhead to a single transaction (getting the subject line) as opposed to two transactions (getting subject line and getting e-mail content). As would be known to a person of skill in the art, the reduction of transaction overhead, such as the multiple steps described above, can be significant. In some case, when the content of the e-mail is short, the bandwidth used as part of the transaction overhead may be greater than the content of the message itself.

Furthermore, the user has the advantage that if the content of the message is all in the subject line, he does not need network access in order to read his e-mail. For example, if the user is reading his e-mail using a portable device, the user will require a connection to the network in order to click on an e-mail and download it. If the user is in a dead spot, he will be unable to access the content of his e-mail messages. However, according to embodiments of the present invention, the content is in the subject line. Thus, if the user is seeing the subject line, he is also seeing the content of the e-mail.

As yet another advantage, the multiple line e-mail title also allows for the inclusion of hyperlinks 804 in the title. A user can simply click the link provided in the title, and be taken to the page specified in the link. This advantageously solves the problem when the sender simply wishes to direct the receiver to a page for viewing. Prior to this invention, the sender may compose an e-mail, with nothing in the body except for the link. The receiver is then forced to open the e-mail for the sole purpose of accessing the link. Embodiments of the present invention avoid this problem by allowing the inclusion of the link in the subject line. The receiver simply reads the subject line, and if he wishes to follow the link, can click on it, directly from his inbox. Advantageously, the receiver is spared the extra step of opening the e-mail, just to gain access to the link.

In addition to the ability to include links in the subject line, embodiments of the present invention also allow the user to format 806 the subject line, using the same formatting capabilities present in the body of an e-mail. The sender can use bold text, underlines, justification, different fonts, or any other formatting capabilities that would have been present in the e-mail body. In this way, the subject line can be more readable, as opposed to a simple long string of text. To the receiver, the content of the subject line will be just as easy to read as the message body, as all of the available formatting tools for the message body will also apply to the multiple line subject line.

Improved Message Threading

Embodiments of the invention also provide for improved message threading. As is known, may e-mail exchanges involve multiple back and forth messages. For example, the initial sender may send a message asking a question. The recipient may then respond to the message with an answer, and pose an additional question. The initial sender may respond, and so on. Many e-mail programs provide the ability to include the text of the previous message in a response, such that the entire conversation to date is available in the e-mail. FIG. 9 depicts such an e-mail system, and a short back and forth e-mail conversation.

As shown in FIG. 9, an exemplary inbox of a recipient is shown with three messages. The first message 902 may be the initial message. Screen 912 is an exemplary depiction of the contents of e-mail 902, in which the recipient is being asked if he wants to go to lunch. The recipient may then reply to the original sender (not shown). The original sender may then reply to the reply message, which is shown in the inbox as message 904. The contents of the message are displayed in screen 914, which is an exemplary screen shot of the contents of an e-mail. As can be seen, the senders original text, as well as the recipients reply text are included in the e-mail message. Typically, the text that was quoted from a different message bears some indication that it is text quoted from an original e-mail. As shown in FIG. 9, quoted text is depicted with the ">" symbol, with the number of symbols indicating the original message. For example, when quoting text from in a reply message, a single ">" is added. However, if the text was already quoted text, the added ">" symbol would make it appear as two ">>" symbols.

The reply scheme can continue indefinitely. As is shown in e-mail 906, which is depicted in screen shot 916, there can be a reply to the reply which itself a reply. As shown in the screen shot 916, the original text can be determined based on the number of ">" symbols. It should be understood that the use of the ">" symbol is only for purposes of explanation. Any other type of indication, such as text in italics, different colored text, or other forms of indication can be used to indicate text that was quoted from an original message. Such other forms of indication would be readily known to one of skill in the art.

The e-mail system as depicted in FIG. 9 presents several problems. First, as can be seen by the third e-mail 916, once there are multiple back and forth messages, the content of the e-mail begins to look quite jumbled. As yet another problem, the entire conversation is not depicted in a single place. Depending on which e-mail is opened, the conversation is in a different place. If the user clicks on the wrong e-mail, he is completely unaware of the additional responses. Furthermore, the system depicted in FIG. 9 is a simple conversation with only two users. However, the conversation could get much more complicated when multiple users are involved. Complications arising from multiple user communications will be described with reference to FIG. 10.

FIG. 10 depicts an e-mail conversation between multiple parties. For example, if three users are involved in a conversation, the first user may send a message to the other two. Each of those users may respond to all of the users. The first user may then reply to all users, but depending on which e-mail he responds to, the contents of at least one e-mail will be lost. This situation is depicted in FIG. 10. For purposes of explanation, the three parties to the conversation are a sender (not shown), Bill (1002), and Ted (1004). An initial sender may send a message to both Bill 1002 and Ted 1004 asking if they want to go to lunch.

The initial e-mail may appear in both Bill and Ted's e-mail inbox as depicted in screens 1006 and 1008 respectively. Bill may respond indicating he wants to go to McDonalds 1010, while Ted responds he wishes to go to Burger King 1012. The initial sender may then reply to either Bill's or Ted's message. However, depending on which message he replies to, the resulting message appears quite different. For example, if the sender replies to the e-mail indicating the preference to go to McDonald's, the reply will appear as shown in screen 1014. On the other hand, if the sender replies to the message indicating a preference for Burger King, the reply will appear as in screen 1016. As should be clear, the conversation could get quite confusing. As more people are added, or more responses are sent, the situation only gets worse.

Embodiments of the present invention advantageously resolve this problem by providing an improved method of displaying threaded e-mails. First, when an e-mail is selected, the system may gather all e-mails that are related to the thread. For example, in the system depicted in FIG. 9, if the user selected the middle e-mail 904, he would only see part of the conversation. Embodiments of the invention will gather all e-mail that is part of a particular thread, regardless of which individual e-mail in the thread is selected.

Figure 11:
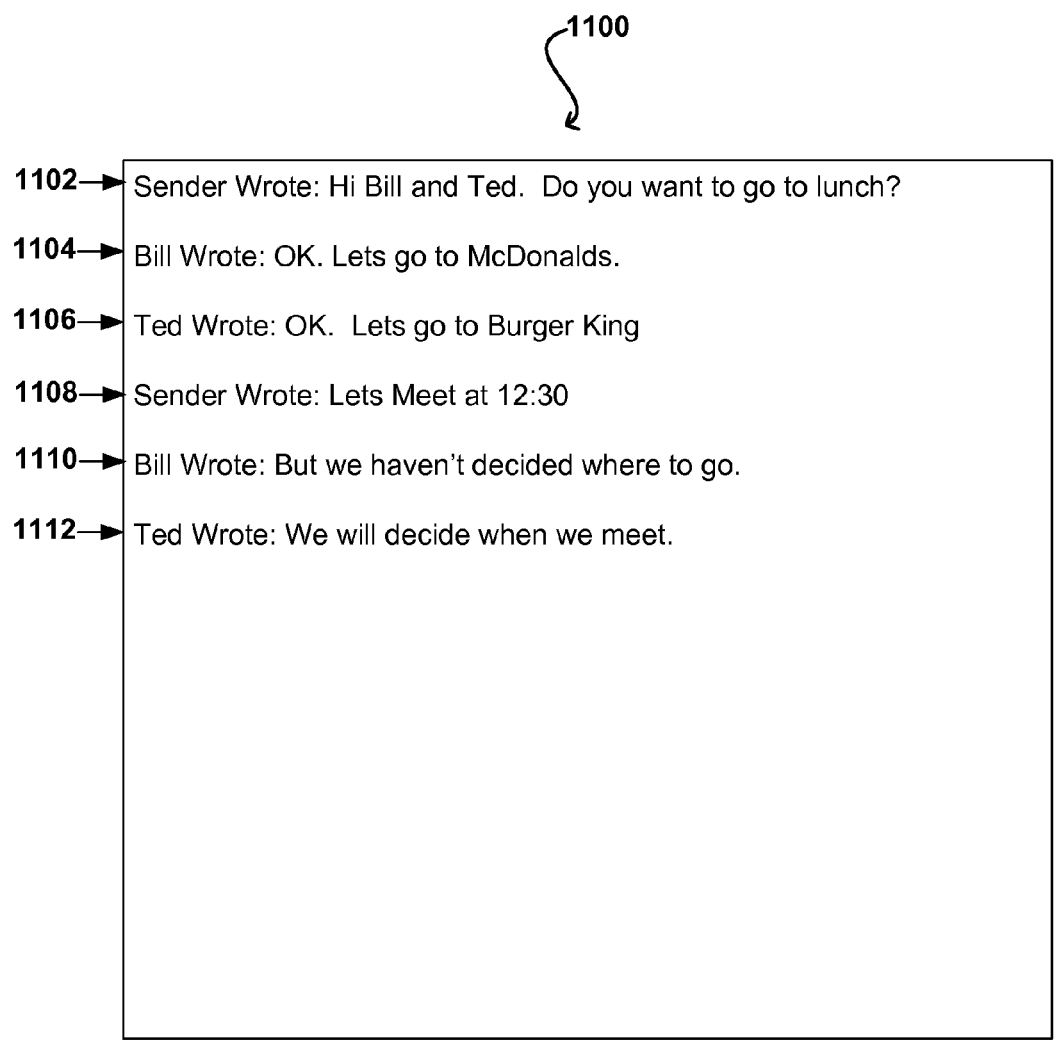
FIG. 11 depicts an improved threaded e-mail display.

Second, as depicted in FIG. 11, embodiments of the invention will display all of the e-mails in a given thread as part of a single page. The contents of each e-mail are included, such that the conversation flows as if it were to have occurred in person. As shown in FIG. 11, because both Bill and Ted's responses are shown as part of a single thread, it is clear that they have not made a decision as to where to go to lunch.

FIG. 11 depicts a screen 1100 in which an improved threaded e-mail display of embodiments of the present disclosure is presented. The content of all of the e-mail message that make up a thread are displayed, in chronological order in a single place, such that the conversation flows as if it were occurring in person. For example, the initial e-mail message 1006, 1008 is shown in a single line 1102. Each of the reply messages 1010, 1012 are also depicted as replies 1104, 1106. However, because the e-mail replies are all displayed on a single screen, there is no confusion as to what is contained in the e-mail thread. The sender replies 1108 to either message with a proposed time to meet for lunch. However, from viewing the improved message thread, it is clear 1110 that a decision on where to go to lunch has not yet been made. This disconnect is addressed in final reply 1112.

Because the e-mail system will find all e-mails in the thread, and display them all at once on a single page, there is not the problem depicted in FIG. 10, wherein depending on which e-mail is responded to, different content appears. Furthermore, because the e-mail system will order the message in the order of time that they were sent, it becomes easier to follow the flow of the e-mail conversation.

Instant Messaging Visual Profile

As mentioned above, embodiments of the present invention provide for an enhanced e-mail system that includes visual profiles that are associated with an e-mail. The picture used for the profile is completely under the control of the user. It can be changed, or deleted at will. The feature of a user controlled profile is not limited to e-mail only. Many users communicate through instant messaging. Instant messaging in some cases allows for the user to include a picture, thus identifying the user.

Embodiments of the present invention allow for a user to maintain control of the picture used in an instant messaging system. The user is able to select which picture is used for the instant messaging system, and is able to decide when to change or remove the picture. Because the user maintains control of the picture used in the profile, he does not need to worry that the people with whom he is communicating may keep the picture. The ability to delete the picture generally comes from the same mechanism as described above with respect to the visual profiles for an e-mail, however the feature is applied in an instant messaging context.

Reply and Delete Original

Embodiments of the invention provide for an enhanced e-mail system. In some embodiments, the e-mail system includes a reply and delete original option. As is known, many e-mail systems provide the ability to reply to an e-mail. The reply can be to the original sender only (e.g. "reply") or to the original sender as well as all other recipients (e.g. "reply all"). Typically, in prior art systems, when a recipient of an e-mail replies to the e-mail, the original e-mail (e.g. the one being replied to) stays in the recipients inbox.

Figure 12:
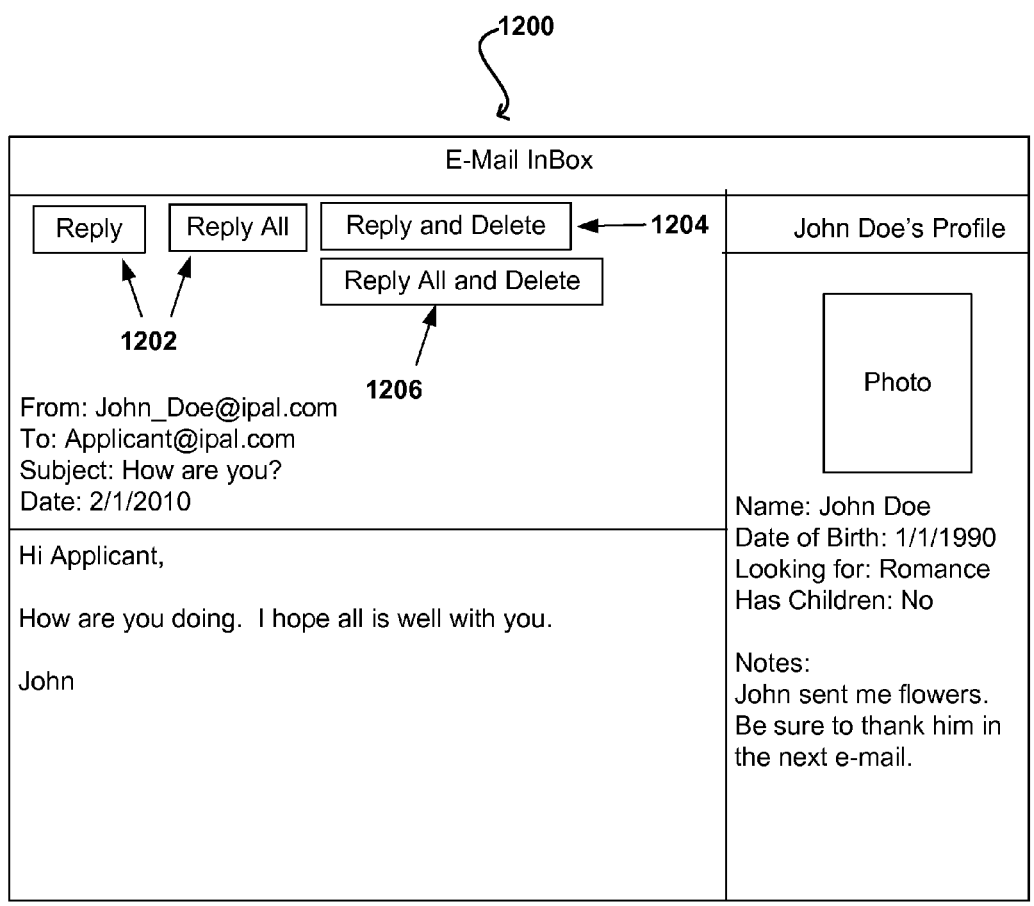
FIG. 12 depicts an e-mail with a reply and delete original option.

Embodiments of the present invention advantageously provide a "reply/reply all and delete original" option. Such an option is depicted in FIG. 12. The screen 1200 depicts an e-mail viewing screen similar to the one shown with respect to FIG. 2. The general elements of an e-mail reader were described with respect to FIG. 2, and such description will not be repeated here. The screen 1200 may include conventional reply and reply all 1202 buttons. As explained above, when a user clicks one of these buttons, he may reply to an e-mail message. Operation of a reply/reply all button would be known to one of skill in the art.

Embodiments of the present disclosure add a reply and delete 1204 and a reply all and delete 1206 button. When the user clicks, for example, the reply and delete 1204 button, a reply message to the original sender of the e-mail can be composed and sent. The difference between a normal reply 1202 button and the reply and delete 1204 button is that upon sending the message, the original message in the recipient's inbox is deleted. The reply all and delete button 1206 operates in a similar manner, with the difference being that the reply message will be sent to all recipients of the e-mail, as opposed to just the sender of the e-mail.

Although FIG. 12 depicts the reply/reply all/reply and delete/reply all and delete buttons as separate buttons, it should be understood that this is merely exemplary. In some embodiments, the delete original aspect may be presented in a different form, such as a radio button associated with a reply/reply all button. Any number of other presentations have been contemplated. What should be understood is that the e-mail system of an embodiment of the present disclosure provides for the ability to reply to a message and delete the original message with a single user action.

As mentioned above, typical e-mail systems provide the ability to reply to an e-mail, however the original e-mail is left in the recipient's inbox. This can cause the recipient's inbox to become cluttered with e-mail that has already been read and replied to. Although the recipient could manually delete the original e-mail, this is an extra step that requires the recipient to be vigilant in deleting e-mails after they have been replied to. Embodiments of the invention advantageously reduce the process of replying to an e-mail and deleting the original to a single step. In this way, the recipient of an e-mail knows that the e-mails in his inbox have not already been replied to, and may need further action. Thus, the mere presence of an e-mail in the inbox can be used to indicate that there is an e-mail that has not yet been responded to.

Furthermore, the recipient also does not generally lose the contents of the original e-mail. Typically, when an e-mail is replied to, the contents of the original e-mail are included in the reply. This process has been explained with respect to FIG. 9. The reply is also typically stored in the user's sent box (not shown). Thus, if the user does have some need to view the original e-mail, he can always review the contents of the original e-mail in the sent box. Thus the user is advantageously able to keep his e-mail in box clutter free, while at the same time retaining the ability to view e-mails that have already been replied to.

The reply and delete original feature is useful in all e-mail systems, as described above, however the feature is even more useful in a mobile environment. In a mobile environment, with potentially limited bandwidth, the operation of responding and deleting the original in a single step decreases the amount of wireless bandwidth that is required. In the past, the user would respond to an e-mail, and then must conduct a separate operation to delete the original. Each of these operations requires network resources. However, with embodiments of the present invention, the steps are reduced to a single step, thus reducing the overall amount of network bandwidth required.

Figure 13:
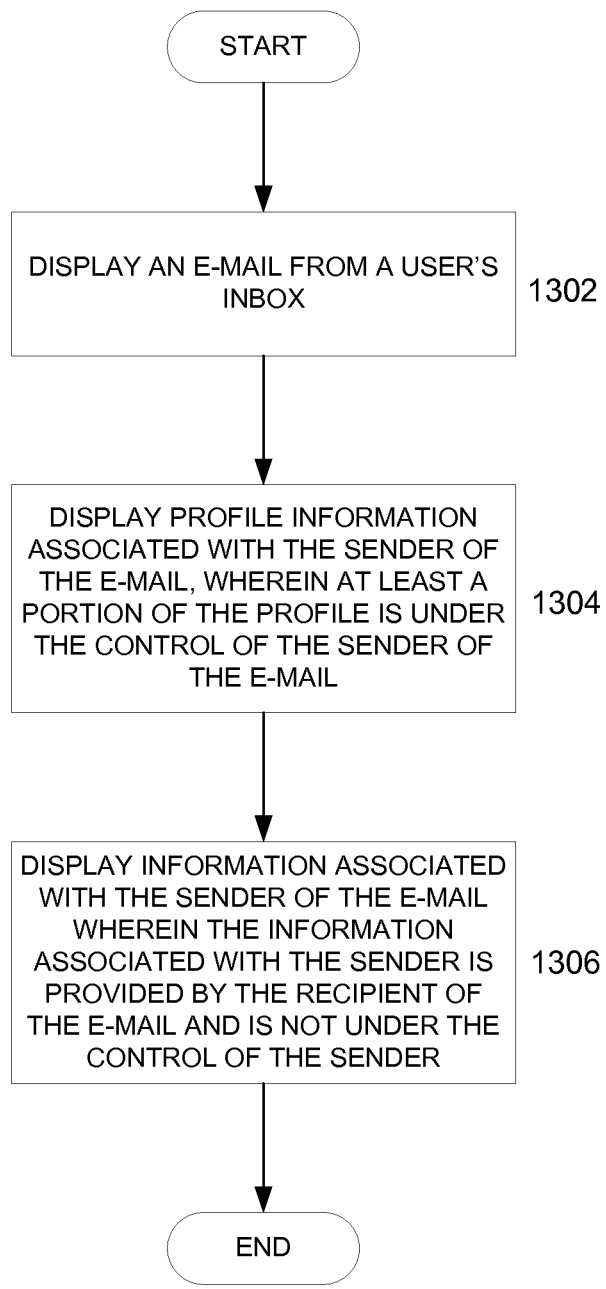
FIG. 13 depicts a high level flow diagram of a sender visual profile.

FIG. 13 depicts a high level flow diagram of a sender visual profile. The process starts at step 1302, wherein an e-mail from a user's inbox is displayed. As described above, the specific form of the display is not important, and known techniques of displaying an e-mail can be used. The process then continues on to step 1304, wherein displayed concurrently with the e-mail is information related to a profile of the sender of the e-mail. As described above, such profile information can include a photograph of the sender or other biographic information associated with the sender. Furthermore, the profile information may be partially under the control of the sender. As described above, the sender may perform updates to their own profile. However, the recipient may choose which portions of the profile to display. However, the profile information remains under the final control of the sender, as the sender can always completely delete access to the profile.

The process may then continue on to step 1306 wherein information associated with the sender of the e-mail is displayed. However, the information associated with the sender in step 1306 is provided by the recipient of the e-mail and is not under the control of the sender. Thus, the recipient of the e-mail can make notes regarding the sender, and these notes remain, regardless of if the sender updates his profile.

Figure 14:
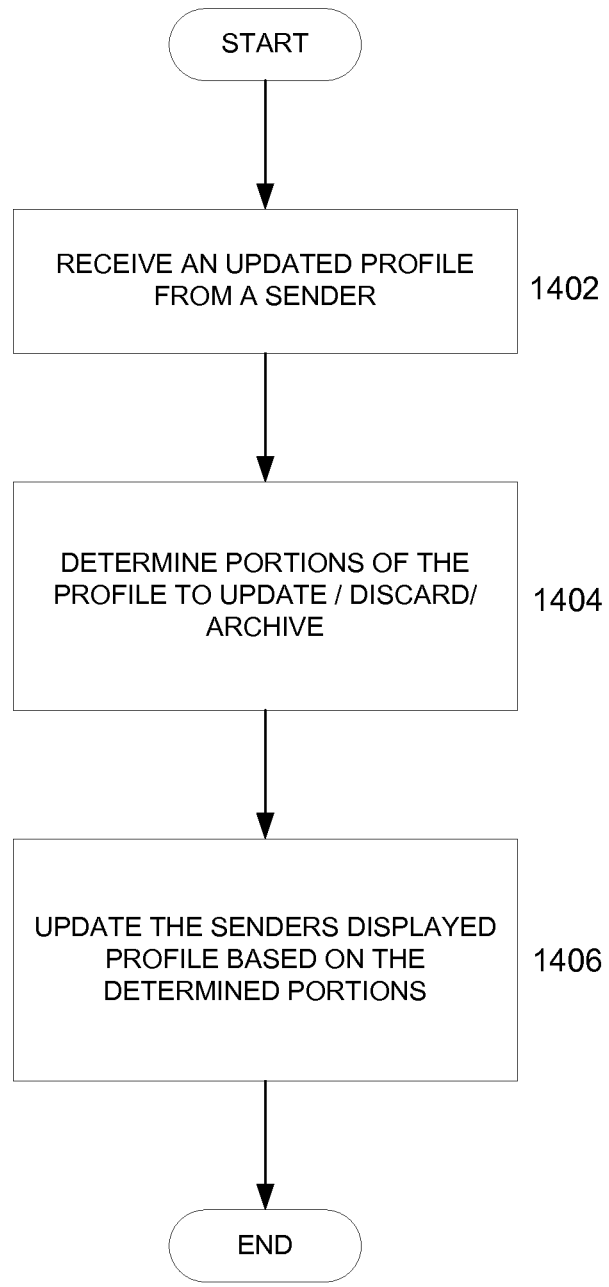
FIG. 14 depicts a high level flow diagram of updating a user profile based on a user initiated update.

FIG. 14 depicts a high level flow diagram of updating a user profile based on a user initiated update. The process begins at step 1402, wherein an updated profile is received from a sender. As described above, an updated profile may be sent from a sender to a recipient. The recipient can be notified that the sender has new profile information.

The process then moves on to step 1404 wherein the recipient may view the information in the sender's updated profile. The recipient then determines which elements of the updated profile should be updated in the profile displayed to the recipient. The recipient can also choose to discard updated elements or archive those elements. As explained above, the recipient is able to select which elements of the profile are updated. However, it should be understood that this selection of elements to update only affects the visual profile of the sender as it is seen by an individual recipient. The profile of the sender as viewed by a different recipient may also be different, based on the preferences of that particular recipient.

The process then continues on to step 1406 wherein the sender's profile is updated according to the determinations made in step 1404. Again, the update that occurs is only to the profile that is displayed to the particular recipient. The sender's actual profile and the profile as seen by other recipients are unaffected by changes made by an individual recipient.

Figure 15:
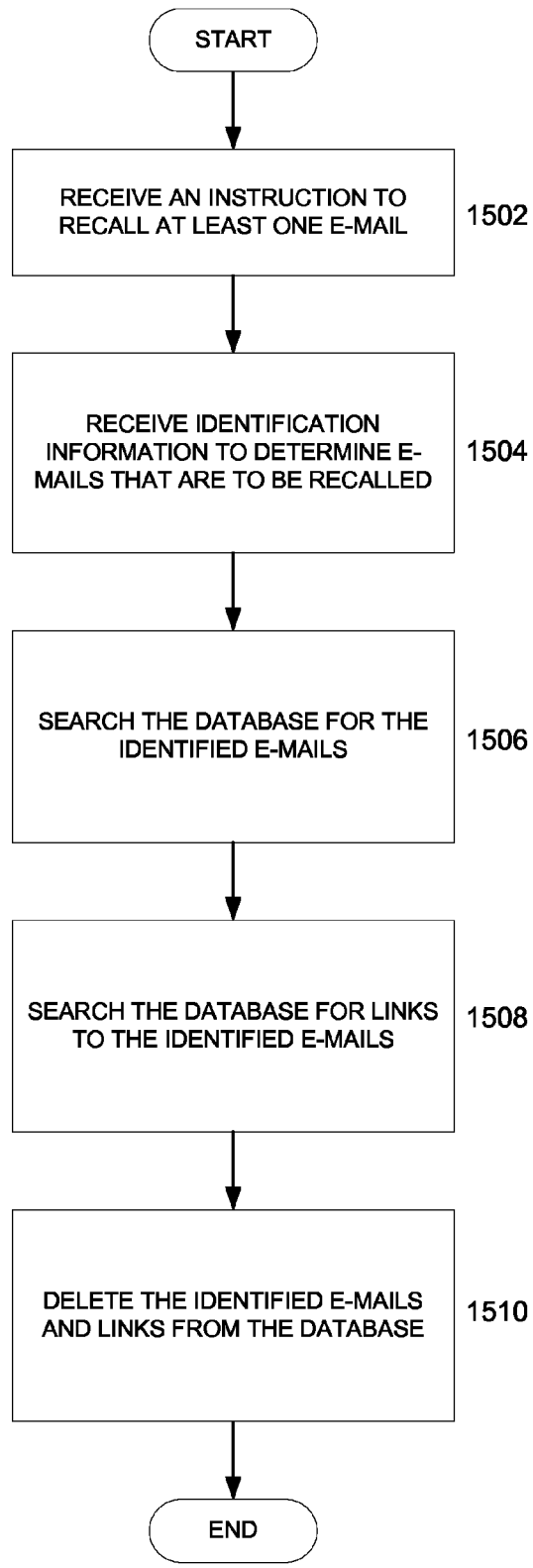
FIG. 15 depicts a high level flow diagram of the process of recalling an e-mail.

FIG. 15 depicts a high level flow diagram of the process of recalling an e-mail. The process may begin at step 1502 wherein an instruction to recall at least one e-mail is received. The process then continues on to step 1504 wherein identification information for the at least one e-mail to be recalled is received. As explained above, the information can include the recipient's e-mail address. Information identifying the e-mail to be recalled can also include specific sent dates, sent date ranges, sent dates before a defined date, sent dates after a defined date, or any combination thereof. Identification information can also include specific e-mails.

The process continues on to step 1506 wherein the database is searched for the identified e-mails. Furthermore, the process continues on to step 1508 wherein the database is searched to identify links to the e-mails that are being recalled. As described with reference to FIG. 5, in some cases a user of an external e-mail system may not receive an actual e-mail, but rather a link to the contents of the e-mail. In step 1508, these links to the content are identified.

At step 1510, the e-mails identified in step 1506 and the links identified in step 1508 are deleted. Thus, the e-mail is effectively recalled, because it is no longer available to the recipient. In the cases where the recipient was sent a link to the e-mail content, the links will no longer point to the specified content, because the links to the content have been deleted.

Figure 16:
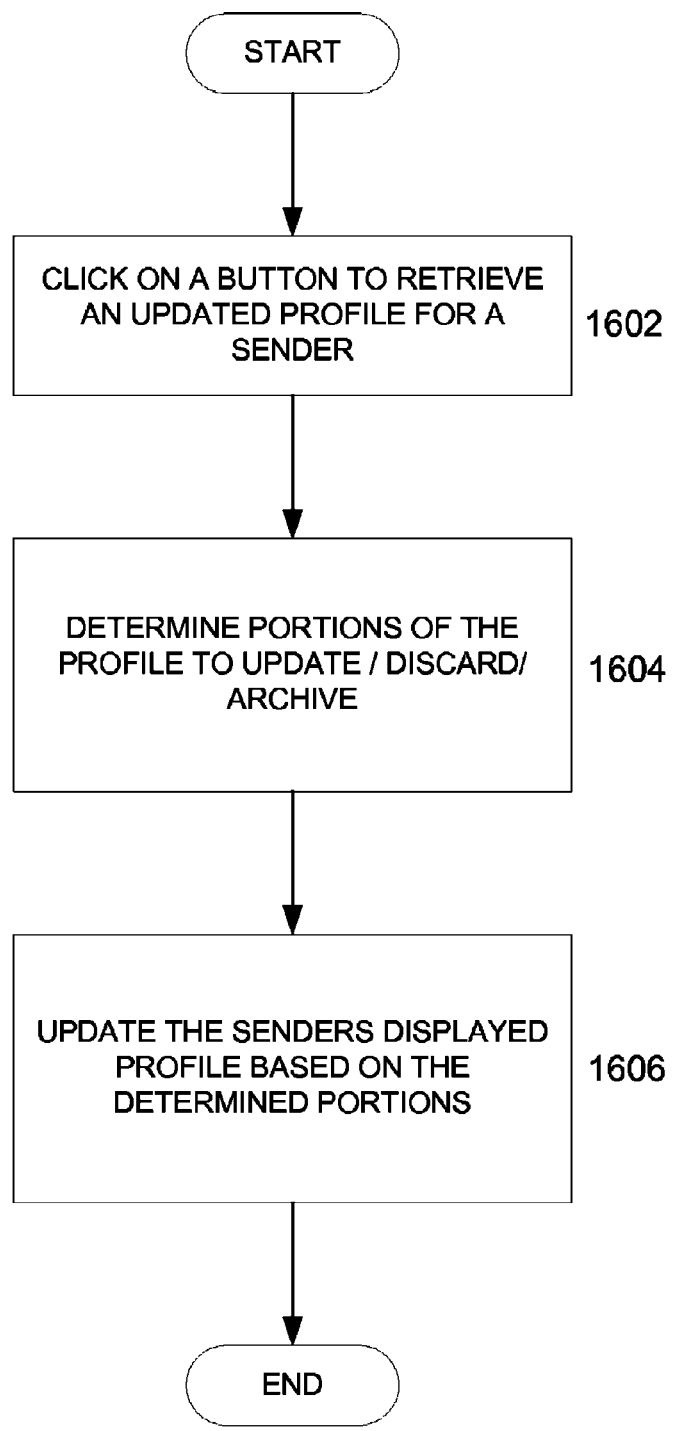
FIG. 16 depicts a high level diagram of updating a user's profile by a recipient.

FIG. 16 depicts a high level diagram of updating a user's profile by a recipient. The steps performed are very similar to those performed in the method described in FIG. 14. The process begins at step 1602 wherein the user clicks on a button to retrieve updated sender profile information. The process then continues on to step 1604 wherein the user decides which portions of the updated profile to keep. Step 1604 is essentially the same as step 1404. At step 1606, the senders profile, as viewed by the recipient is updated. Step 1606 is essentially the same as step 1406 described above.

Figure 17:
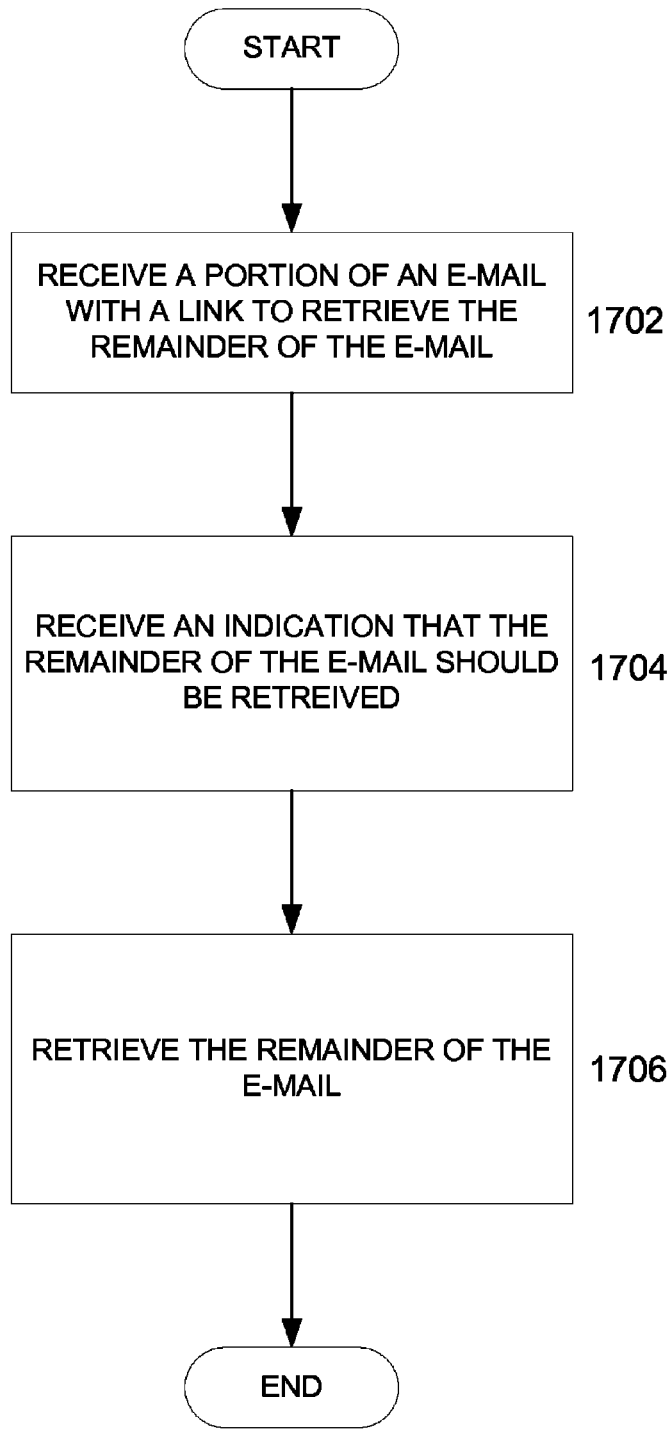
FIG. 17 is a high level flow diagram of receiving an e-mail with a link for more.

FIG. 17 is a high level flow diagram of receiving an e-mail with a link for more. The process begins at step 1702 wherein an e-mail is received. The e-mail may only contain a portion of the full content of the e-mail. The e-mail may include an indication that more of the e-mail is available. At step 1704, an indication that the reminder of the e-mail should be retrieved is received. For example, if a link specifying that more of an e-mail is available, the indication may be the user clicking on the link. At step 1706, the reminder of the e-mail is retrieved.

Figure 18:
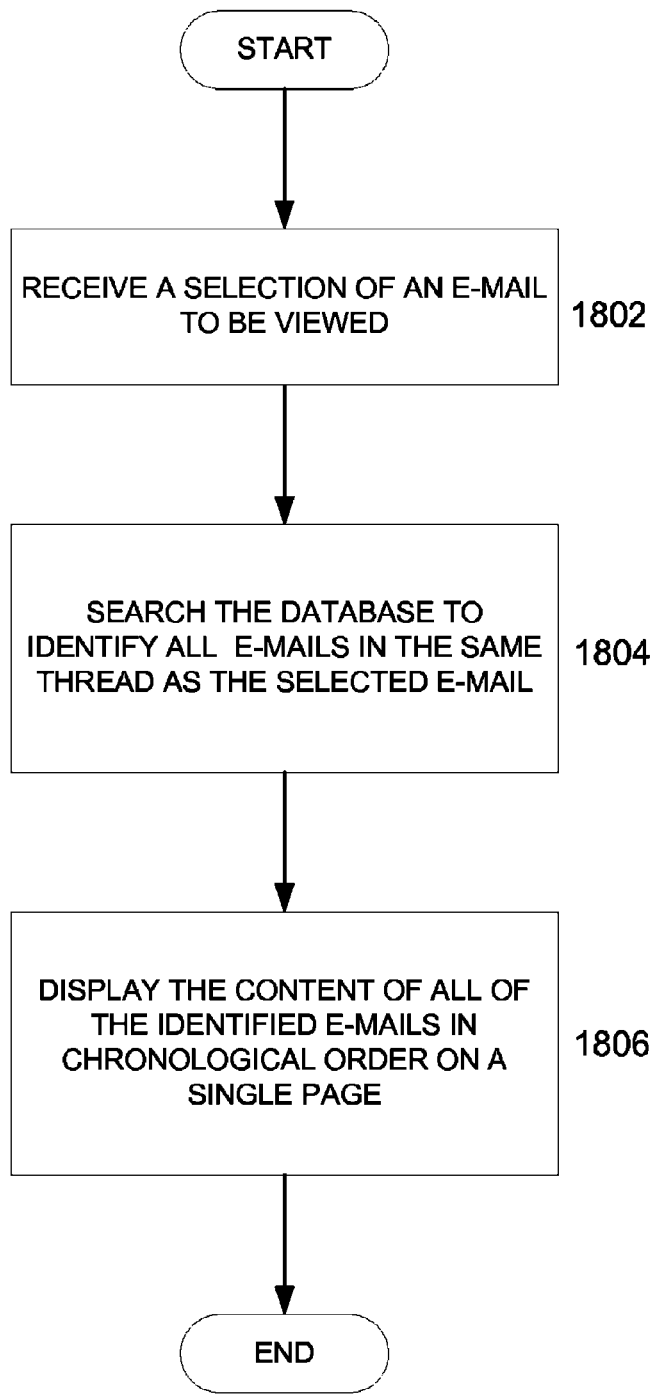
FIG. 18 depicts a high level flow diagram of an improved message threading display.

FIG. 18 depicts a high level flow diagram of an improved message threading display. The process may begin at step 1802 wherein a selection of an e-mail to be viewed is received. As described above, the selected e-mail need not be the latest e-mail in a thread, but rather may be an e-mail anywhere within the thread.

The process may then continue to step 1804 wherein the database is searched to identify all e-mails that are related to the e-mail selected in step 1802. For example, all replies to the e-mail, all forwards of the e-mail, or any other e-mails that are in the same thread as the selected e-mail. At step 1806, the identified e-mails may all be displayed, in chronological order, on a single display screen. This allows for the entire thread of the e-mail to be viewed in one convenient location, in chronological order, without having to view each identified e-mail individually.

Figure 19:
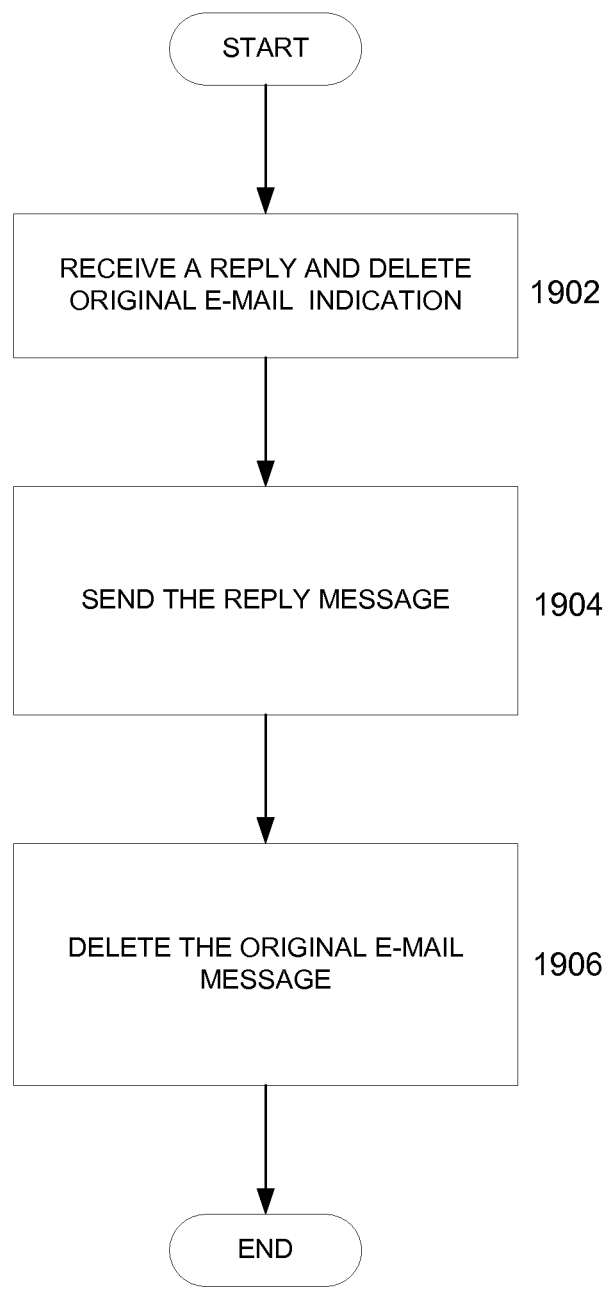
FIG. 19 is a high level flow diagram of a single step reply and delete original process.

FIG. 19 is a high level flow diagram of a single step reply and delete original process. The process may begin at step 1902, wherein an indication that an e-mail should be replied to and then deleted is received. At step 1904, the reply e-mail is sent. As explained above, the rely message may be sent to just the original sender of the e-mail or to all recipients of the e-mail. At step 1906 the original e-mail is deleted from the database.

Figure 20:
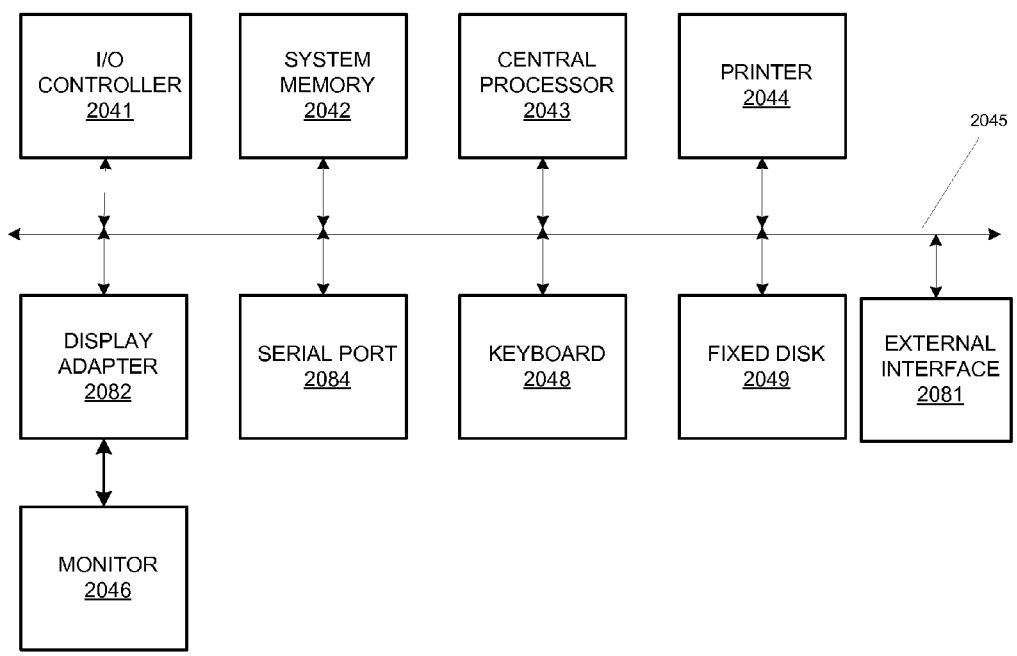
FIG. 20 depicts exemplary computer systems that can be used in embodiments of the invention.

FIG. 20 is a high level block diagram of a computer system that may be used to implement any of the entities or components (e.g., the dating website or the computers used by the users to access the dating website, etc.) described above may include one or more of the subsystems or components shown in FIG. 20, which is a block diagram of a computer apparatus. The subsystems shown in FIG. 20 are interconnected via a system bus 2075. Additional subsystems such as a printer 2044, keyboard 2048, fixed disk 2049, monitor 2046, which is coupled to display adapter 2082, and others are shown. Peripherals and input/output (I/O) devices, which couple to I/O controller 2041, can be connected to the computer system by any number of means known in the art, such as serial port 2084. For example, serial port 2084 or external interface 2081 can be used to connect the computer apparatus to a wide area network such as the Internet, a mouse input device, or a scanner. The interconnection via system bus allows the central processor 2043 to communicate with each subsystem and to control the execution of instructions from system memory 2042 or the fixed disk 2049, as well as the exchange of information between subsystems. The system memory 2042 and/or the fixed disk 2049 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:

1. A method for updating a sender profile of a sender, at least a portion of the sender profile to be concurrently displayed with an electronic communication from the sender, the method comprising:

enabling, by a server computer, a sender of one or more electronic communications to update at least a first portion of a sender profile of the sender by replacing current profile information with updated profile information;

enabling, by the server computer, a recipient of one or more electronic communications from the sender to update at least a second portion of the sender profile of the sender;

responsive to the sender updating the first portion of the sender profile of the sender by replacing the current profile information with the updated profile information, enabling, by the server computer, the recipient to discard one or more elements of the updated profile information of the first portion of the sender profile of the sender and to continue using one or more elements of the current profile information of the first portion of the sender profile of the sender, wherein the one or more elements of the updated profile information of the first portion of the sender profile of the sender that were discarded by the recipient include at least one of a picture and biographic data; and enabling, by the server computer, the recipient to archive the one or more elements of the updated profile information of the first portion of the sender profile of the sender that were discarded by the recipient;

concurrently displaying, by the server computer, to the recipient an electronic communication from the sender and at least one of:

the one or more elements of the current profile information of the first portion of the sender profile of the sender that the recipient continued using;

one or more elements of the updated profile information of the first portion of the sender profile of the sender that the recipient did not discard; and the second portion of the sender profile of the sender.

2. The method of claim 1, wherein enabling the recipient to discard the one or more elements of the updated profile information of the first portion of the sender profile of the sender, comprises:

receiving, from the recipient, a selection of one or more elements of the first portion of the sender profile of the sender that are to be updated; and updating only the one or more elements of the first portion of the sender profile of the sender that are selected to be updated, wherein the one or more elements of the first portion of the sender profile that are selected to be updated are displayed to the recipient when an electronic communication is received from the sender; and discarding the one or more elements of the updated profile information of the first portion of the sender profile of the sender that do not correspond to the one or more elements of the first portion of the sender profile of the sender that are selected to be updated.

3. The method of claim 1, wherein the updated profile information of the first portion of the sender profile of the sender is received in response to a request sent by the recipient.

4. The method of claim 1 wherein the electronic communication is an e-mail message.

5. The method of claim 1 wherein the electronic communication is an instant message.

6. A non-transitory computer readable medium storing thereon a set of instructions which when executed by a computer processor cause the processor to execute the method of claim 1.

7. The method of claim 1, further comprising:

enabling, by the server computer, the recipient to archive one or more elements of at least one of the current profile information and the updated profile information of the first portion of the sender profile of the sender that the recipient did not discard.

8. The method of claim 1, wherein at least one of the one or more elements of the updated profile information of the first portion of the sender profile of the sender is a profile picture of the sender, wherein archiving the profile picture involves saving the profile picture in an album that can be viewed at any time by the recipient.

9. The method of claim 1, wherein the second portion of the sender profile of the sender is a notes section that the recipient can reference when reviewing an electronic communication received from the sender.

10. A system, comprising:

a processor; and a non-transitory computer-readable medium coupled to the processor, including code that is executable by a processor, for implementing a method comprising:

enabling a sender of one or more electronic communications to update at least a portion of a sender profile of the sender by replacing current profile information with updated profile information;

responsive to the sender updating the sender profile of the sender, enabling a recipient of one or more electronic communications from the sender to discard one or more elements of the updated profile information of the sender profile of the sender and opt to continue using one or more elements of the current profile information of the sender profile of the sender, wherein the one or more elements of the updated profile information of the sender profile of the sender that were discarded by the recipient include at least one of a picture and biographic data; and enabling the recipient to archive the one or more elements of the updated profile information of the sender profile of the sender that were discarded by the recipient; and concurrently displaying to the recipient an electronic communication from the sender and at least one of:

the one or more elements of the current profile information of the sender profile of the sender that the recipient opted to continue using; and the one or more elements of the updated profile information of the sender profile of the sender that the recipient did not discard.

11. The system of claim 10, wherein enabling the recipient to discard one or more elements of the updated profile information of the sender profile of the sender, comprises:

receiving, from the recipient, a selection of one or more elements of the sender profile of the sender that are to be updated; and discarding the one or more elements of the updated profile information that do not correspond to the one or more elements of the sender profile of the sender that are to be updated.

12. The system of claim 10 wherein the electronic communication is an e-mail message.

13. The system of claim 10 wherein the electronic communication is an instant message.

14. The system of claim 10, wherein the method further comprises:

enabling the recipient to archive one or more elements of at least one of the current profile information and the updated profile information of the first portion of the sender profile of the sender that the recipient did not discard.

15. A system, comprising:
a processor; and
a non-transitory computer-readable medium coupled to the processor, including code that is executable by a processor, for implementing a method comprising:
storing in a database current profile information of a first user, the current profile information of the first user to be concurrently displayed with an electronic communication from the first user to a second user;
updating, upon the request of the first user, at least a portion of the current profile information of the first user with updated profile information of the first user;
rather than automatically displaying the updated profile information of the first user with an electronic communication from the first user to the second user,
  providing to the second user an option to discard one or more elements of the updated profile information of the first user and continue having one or more elements of the current profile information of the first user concurrently displayed with electronic communications from the first user to the second user, wherein the one or more elements of the updated profile information of the first user that were discarded by the second user include at least one of a picture and biographic data; and
  providing to the second user an option to archive the one or more elements of the updated profile information of the first user that were discarded by the second user.

16. The system of claim 15, wherein providing to the second user the option to discard the one or more elements of the updated profile information of the first user, comprises:
  receiving, from the second user, a selection of one or more elements of the current profile information of the first user that are to be updated; and
  discarding the one or more elements of the updated profile information that do not correspond with the one or more elements of the current profile information of the first user that are to be updated.

17. The system of claim 15 wherein the electronic communication is an e-mail message.

18. The system of claim 15 wherein the electronic communication is an instant message.

19. The system of claim 15, wherein the method further comprises:
  providing to the second user an option to archive the one or more elements of the updated profile information of the first user that were not discarded by the second user.

20. The system of claim 15, wherein at least one of the one or more elements of the updated profile information of the first user that were discarded by the second user is a profile picture of the first user, wherein archiving the profile picture involves saving the profile picture in an album that can be viewed at any time by the second user.

* * * * *